US 8,684,108 B2

(12) United States Patent
Turner et al.

(10) Patent No.: US 8,684,108 B2
(45) Date of Patent: Apr. 1, 2014

(54) SYSTEM AND METHOD FOR MONITORING AND CONTROLLING UNDERGROUND DRILLING

(71) Applicants: William Evans Turner, Durham, CT (US); Mark Ellsworth Wassell, Houston, TX (US)

(72) Inventors: William Evans Turner, Durham, CT (US); Mark Ellsworth Wassell, Houston, TX (US)

(73) Assignee: APS Technology, Inc., Wallingford, CT (US)

( * ) Notice: Subject to any disclaimer, the term of this patent is extended or adjusted under 35 U.S.C. 154(b) by 0 days.

(21) Appl. No.: 13/646,505

(22) Filed: Oct. 5, 2012

(65) Prior Publication Data

US 2013/0098683 A1     Apr. 25, 2013

Related U.S. Application Data

(62) Division of application No. 12/698,125, filed on Feb. 1, 2010, now Pat. No. 8,453,764.

(51) Int. Cl.
*E21B 47/00*     (2012.01)
*E21B 44/00*     (2006.01)

(52) U.S. Cl.
USPC .................. 175/40; 175/24; 702/9; 703/10

(58) Field of Classification Search
USPC ..................... 175/24, 40; 702/9; 703/10
See application file for complete search history.

(56) References Cited

U.S. PATENT DOCUMENTS

| 3,507,341 A | 4/1970 | Basgan |
| 3,626,482 A | 12/1971 | Quichaud et al. |

(Continued)

FOREIGN PATENT DOCUMENTS

| DE | 3434565 A1 | 3/1986 |
| GB | 2335450 A1 | 9/1999 |
| WO | WO 97/46793 A1 | 12/1997 |
| WO | WO9928594 A1 | 6/1999 |

OTHER PUBLICATIONS

APS Technology, Vibration Isolation Subs (VIS™), 2009, Rev. 090807, vA.

(Continued)

*Primary Examiner* — Giovanna Wright
(74) *Attorney, Agent, or Firm* — Baker & Hostetler LLP

(57) ABSTRACT

A system and method for monitoring underground drilling in which vibration is monitored by creating a model of the drill string using finite element techniques or finite difference techniques and (i) predicting vibration by inputting real time values of operating parameters into the model, and then adjusting the model to agree with measured vibration data, (ii) predicting the weight on bit and drill string and mud motor speeds at which resonance will occur, as well as when stick-slip will occur, so that the operator can avoid operating regimes that will result in high vibration, (iii) determining vibration and torque levels along the length of the drill string based on the measured vibration and torque at one or more locations, (iv) determining the remaining life of critical components of the drill string based on the history of the vibration to which the components have been subjected, and (v) determining the optimum drilling parameters that will avoid excessive vibration of the drill string.

21 Claims, 15 Drawing Sheets

(56) References Cited

U.S. PATENT DOCUMENTS

| | | | |
|---|---|---|---|
| 3,813,656 A | 5/1974 | Fowler | |
| 4,019,148 A | 4/1977 | Shawhan | |
| 4,120,198 A | 10/1978 | Tanguy et al. | |
| 4,254,481 A | 3/1981 | Smither et al. | |
| 4,380,172 A | 4/1983 | Imam | |
| 4,507,735 A | 3/1985 | Moorehead et al. | |
| 4,715,451 A | 12/1987 | Bseisu et al. | |
| 4,903,245 A | 2/1990 | Close et al. | |
| 4,954,998 A | 9/1990 | Rector | |
| 4,958,125 A | 9/1990 | Jardine et al. | |
| 5,141,061 A | 8/1992 | Henneuse | |
| 5,160,925 A | 11/1992 | Dailey et al. | |
| 5,220,963 A | 6/1993 | Patton | |
| 5,226,332 A | 7/1993 | Wassell | |
| 5,259,468 A | 11/1993 | Warren et al. | |
| 5,269,383 A | 12/1993 | Forrest | |
| 5,314,030 A | 5/1994 | Peterson et al. | |
| 5,332,048 A | 7/1994 | Underwood et al. | |
| 5,358,059 A | 10/1994 | Ho | |
| 5,368,108 A | 11/1994 | Aldred et al. | |
| 5,448,911 A | 9/1995 | Mason | |
| 5,646,611 A | 7/1997 | Dailey et al. | |
| 5,721,376 A | 2/1998 | Pavane et al. | |
| 5,812,068 A | 9/1998 | Wisler et al. | |
| 5,842,149 A | 11/1998 | Harrell et al. | |
| 5,857,530 A | 1/1999 | Gronseth | |
| 5,880,680 A | 3/1999 | Wisehart et al. | |
| 6,012,015 A | 1/2000 | Tubel | |
| 6,021,377 A | 2/2000 | Dubinsky et al. | |
| 6,023,658 A | 2/2000 | Jeffryes | |
| 6,088,294 A | 7/2000 | Leggett, III et al. | |
| 6,092,610 A | 7/2000 | Kosmala et al. | |
| 6,101,444 A | 8/2000 | Stoner | |
| 6,205,851 B1 | 3/2001 | Jogi | |
| 6,206,108 B1 | 3/2001 | MacDonald et al. | |
| 6,227,044 B1 | 5/2001 | Jarvis | |
| 6,233,524 B1 | 5/2001 | Harrell et al. | |
| 6,272,434 B1 | 8/2001 | Wisler et al. | |
| 6,296,066 B1 | 10/2001 | Terry et al. | |
| 6,308,787 B1 | 10/2001 | Alft | |
| 6,310,559 B1 | 10/2001 | Laborde et al. | |
| 6,371,204 B1 | 4/2002 | Singh et al. | |
| 6,405,808 B1 | 6/2002 | Edwards et al. | |
| 6,415,878 B1 | 7/2002 | Cargill et al. | |
| 6,419,014 B1 | 7/2002 | Meek et al. | |
| 6,547,016 B2 | 4/2003 | Wassell | |
| 6,564,883 B2 | 5/2003 | Fredericks et al. | |
| 6,609,579 B2 | 8/2003 | Krueger et al. | |
| 6,637,524 B2 | 10/2003 | Kruspe et al. | |
| 6,662,110 B1 | 12/2003 | Bargach et al. | |
| 6,714,138 B1 | 3/2004 | Tumet | |
| 6,732,052 B2 | 5/2004 | MacDonald | |
| 6,968,909 B2 | 11/2005 | Aldred | |
| 7,003,439 B2* | 2/2006 | Aldred et al. | 703/10 |
| 7,054,750 B2 | 5/2006 | Rodney et al. | |
| 7,064,676 B2 | 6/2006 | Hall et al. | |
| 7,100,688 B2 | 9/2006 | Stephenson et al. | |
| 7,140,452 B2 | 11/2006 | Hutchinson | |
| 7,142,986 B2 | 11/2006 | Moran | |
| 7,168,506 B2 | 1/2007 | Boucher et al. | |
| 7,172,037 B2 | 2/2007 | Dashevskiy et al. | |
| 7,219,747 B2 | 5/2007 | Gleitman et al. | |
| 7,225,879 B2 | 6/2007 | Wylie et al. | |
| 7,251,590 B2 | 7/2007 | Huang | |
| 7,313,480 B2 | 12/2007 | Chen et al. | |
| 7,327,634 B2 | 2/2008 | Perry | |
| 7,357,197 B2 | 4/2008 | Schultz et al. | |
| 7,681,663 B2 | 3/2010 | Cobern | |
| 7,735,579 B2 | 6/2010 | Gopalan et al. | |
| 7,775,099 B2 | 8/2010 | Bogath et al. | |
| 7,913,773 B2 | 3/2011 | Li et al. | |
| 8,214,188 B2 | 7/2012 | Bailey | |
| 2006/0195265 A1 | 8/2006 | Schen et al. | |
| 2006/0215491 A1 | 9/2006 | Hall | |
| 2007/0061081 A1 | 3/2007 | Moran | |
| 2010/0214121 A1 | 8/2010 | Puro | |
| 2011/0024188 A1 | 2/2011 | Wassell | |
| 2011/0220410 A1* | 9/2011 | Aldred et al. | 175/26 |
| 2012/0222900 A1* | 9/2012 | Rodney et al. | 175/56 |

OTHER PUBLICATIONS

F. Dupriest & W. Koederitz, "Maximizing Drill Rates With Real-Time Surveillance of Mechanical Specific Energy," SPEAADC Drilling Conference, SPEAADC 92194 (2005).

W. Koederitz & J. Weis, A Real-Time Implementation of MSE, American Association of Drilling Engineers, AADE-05-NTCE-66 (2005).

Mihajlovic et al., Analysis of Friction-Induced Limit Cycling in an Experimental Drill, J. Dynamic Systems Measurement and Control, ASME, Dec. 2004, V. 126, pp. 709-720.

Abstract_Pushkar et al., Field Verification of Model-Derived Natural Frequencies of a Drill String, J. Energy Resour. Tech, Sep. 2002, V 124, Issue 3, 154.

Tech Power Controls Co Composite Catalog, Houston, Texas (2000).

DE 3434565 Mar. 27, 1986 Freisl (Abstract).

Johancsik et al., "Torque and Drag in Directional Wells-Prediction and Measurement," SPE, Jun. 1984, pp. 987-992.

Samuel et al, "Tortuosity Factors for Highly Tortuous Wells: A Practical Approach," SPE/IADC Drilling Conference, SPE/IADC 92565 (2005).

International Patent Application No. PCT/US2011/023179: Notification of Transmittal of the International Search Report and the Written Opinion of the International Searching Authority mailed Mar. 25, 2011.

* cited by examiner

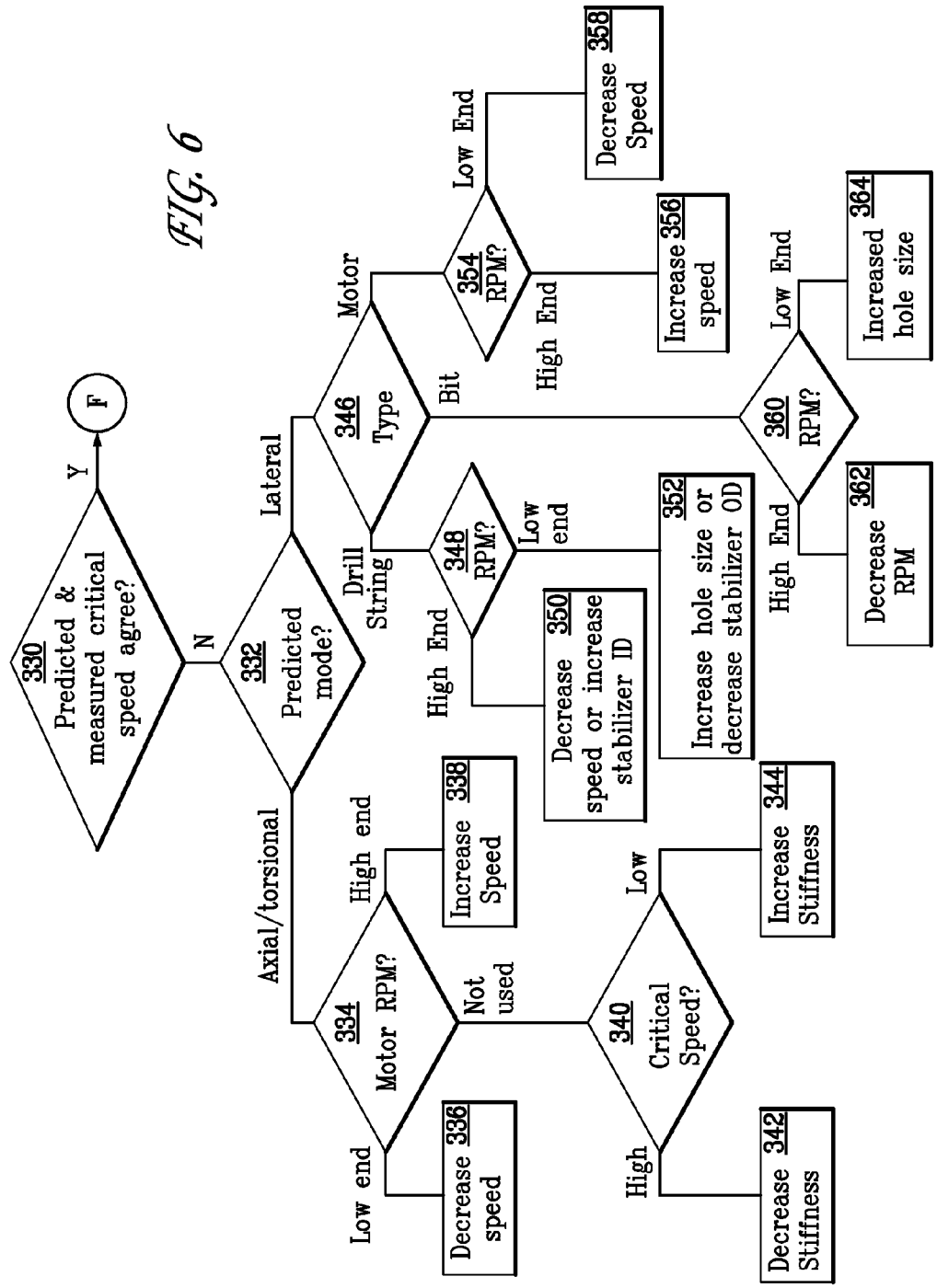

SYSTEM AND METHOD FOR MONITORING AND CONTROLLING UNDERGROUND DRILLING

CROSS REFERENCE TO RELATED APPLICATIONS

This application is a divisional of pending U.S. application Ser. No. 12/698,125, filed Feb. 2, 2010, the contents of which is incorporated by reference herein in its entirety.

FIELD OF THE INVENTION

The present invention relates to underground drilling, and more specifically to a system and a method for monitoring and controlling the drilling operation, especially operation related to drill string vibration, so as to achieve optimum performance and life from the drill string.

BACKGROUND OF THE INVENTION AND RELATED ART

Underground drilling, such as gas, oil, or geothermal drilling, generally involves drilling a bore through a formation deep in the earth. Such bores are formed by connecting a drill bit to long sections of pipe, referred to as a "drill pipe," so as to form an assembly commonly referred to as a "drill string." The drill string extends from the surface to the bottom of the bore.

The drill bit is rotated so that the drill bit advances into the earth, thereby forming the bore. In rotary drilling, the drill bit is rotated by rotating the drill string at the surface. Piston-operated pumps on the surface pump high-pressure fluid, referred to as "drilling mud," through an internal passage in the drill string and out through the drill bit. The drilling mud lubricates the drill bit, and flushes cuttings from the path of the drill bit. In the case of motor drilling, the flowing mud also powers a drilling motor, commonly referred to as a "mud motor," which turns the bit, whether or not the drill string is rotating. The mud motor is equipped with a rotor that generates a torque in response to the passage of the drilling mud therethrough. The rotor is coupled to the drill bit so that the torque is transferred to the drill bit, causing the drill bit to rotate. The drilling mud then flows to the surface through an annular passage formed between the drill string and the surface of the bore.

The drilling environment, and especially hard rock drilling, can induce substantial vibration and shock into the drill string. Vibration also can be introduced by rotation of the drill bit, the motors used to rotate the drill bit, the pumping of drilling mud, imbalance in the drill string, etc. Such vibration can result in premature failure of the various components of the drill string, premature dulling of the drill bit, or may cause the drilling to be performed at less than optimum conditions. For example, although reducing the downhole force applied to the drill bit, commonly referred to as the "weight on bit" ("WOB") or the rotary speed of the drill bit may reduce vibration, it may also reduce drilling efficiency. In particular, drill bits are typically designed for a predetermined range of rotary speed and WOB and do not perform as effectively if operated outside this range in order to avoid excessive vibration. Moreover, operating the drill bit away from its design point can reduce the service life of the drill bit. Substantial vibration can even directly reduce the rate of penetration of the drill bit. For example, very high axial vibration can result in a loss of contact between the drill bit and the surface being drilled.

A drill string may experience various types of vibration. "Axial vibration" refers to vibration in the direction along the drill string axis. "Lateral vibration" refers to vibration perpendicular to the drill string axis. Lateral vibration often arises because the drill string rotates in a bent condition. Two other sources of lateral vibration are "forward" and "backward", or "reverse", whirl. "Whirl" refers to a situation in which the bit orbits around the bore hole in addition to rotating about its own axis. In backward whirl, the bit orbits in a direction opposite to the direction of rotation of the drill bit. "Torsional vibration," also of concern in underground drilling, is usually the result of what is referred to as "stick-slip." Stick-slip occurs when the drill bit or lower section of the drill string momentarily stops rotating (i.e., "sticks") while the drill string above continues to rotate, thereby causing the drill string to "wind up," after which the stuck element "slips" and rotates again. Often, the bit will over-speed as it unwinds.

In general, optimal drilling is obtained when the rate of penetration of the drill bit into the formation is as high as possible while the vibration is as low as possible. The rate of penetration ("ROP") is a function of a number of variables, including the rotational speed of the drill bit and the WOB. During drilling, surface equipment senses the rate of penetration of the drill bit into the formation, the rotational speed of the drill string, the hook load, surface torque, and pressure. Sensors either at the surface or in a bottomhole assembly ("BHA"), or both, measure the axial tensile/compression load, torque and bending.

APS's SureShot™ Surface System

Systems currently on the market, such as APS Technology's SureShot™ surface system, receive and process information from sensors near the bit, such as WOB sensors, torque sensors, inclination sensors (i.e., accelerometers) and azimuth sensors (i.e., magnetometers), and transmit the information to other surface equipment. A surface estimate of WOB may also be derived from hook load and drag calculations. The SureShot™ system also receives data on the mud flow rate from other surface software. Typically, such software determines the mud flow rate from a curve provided by the mud pump supplier relating flow rate to stroke rate of the pump pistons, rather than from a direct flow rate sensors. In any event, using a curve of mud motor flow rate versus motor RPM or an RPM/flow rate factor, the surface software also determines the mud motor RPM. The SureShot™ system also calculates the build rate, normally expressed as degrees per 100 feet or degrees per 30 meters, based on the change in inclination measured by the accelerometers for the depth drilled. It also calculates the turn rate, normally expressed as degrees per 100 feet or degrees per 30 meters, based on the change in azimuth (i.e., the lateral direction of drilling) measured by the magnetometers. However, notwithstanding the availability of such data, obtaining the optimal rate of penetration is a difficult endeavor. Optimization of the drilling process is a constantly changing and ongoing process. Formations may change, bits may dull, mud weight and the hydraulics may change.

APS's Vibration Memory Module™

Systems currently on the market, such as APS Technology's Vibration Memory Module™, process data from accelerometers and magnetometers installed into the bottomhole assembly to determine the amplitudes of axial vibration, and of lateral vibration due to forward and backward whirl, at the location of these sensors. The Vibration Memory Module™ also determines torsional vibration due to stick-slip by measuring and recording the maximum and minimum instantaneous RPM over a given period of time, such as every four seconds, based on the output of the magnetometers. The amplitude of torsional vibration due to stick-slip is then determined by determining the difference between and maximum and minimum instantaneous rotary speeds of the drill string over the given period of time. Preferably, root-mean-square and peak values for the axial, lateral and torsional vibrations are recorded at predetermined intervals, such as every four seconds. The amplitudes of the axial, lateral and torsional vibration are transmitted to the surface via mud pulse telemetry.

Most systems, including the aforementioned Vibration Memory Module™, don't measure the frequency of the vibration, although some high end tools do. Insofar as the inventors are aware, none of the current tools, however, transmit the vibration frequency to the surface. However, when using the Vibration Memory Module™, burst data samples, recorded either as a result of the occurrence of an event or at preselected time periods, may be down loaded from the Vibration Memory Module™ after a run is completed and the BHA assembly is pulled out of the hole. Software at the surface can read the burst sample data, plot it and performs a Fourier analysis to determine the frequency of the vibration.

APS's Well Drill™

Other systems on the market, such as APS Technology's Welldrill™ system employ finite element techniques to predict the resonant frequencies and mode shapes associated with drill string vibration. The WellDrill™ system employs software that uses finite element techniques, in particular ANSYS software, to model the drill string based on the drill string geometry and mechanical properties. As shown in FIG. 1, the model is comprised of beam elements 53, connected by nodes 54, and contact elements 55. As shown in FIG. 2, the entire drill string 4—including a drill bit 8, mud motor 40, stabilizers 41, drill collars 43, Measurement While Drilling ("MWD") tool 56—is modeled by a series of beam elements, nodes and contact elements. A beam element 53 is shown in FIG. 3A and comprises a uniaxial element with tension, compression, torsion, and bending capabilities. These elements have six degrees of freedom at each node: translations in the nodal x, y and z directions and rotations about the nodal x, y and z axes. Stress stiffening and large deflection capabilities are also included. The gaps between drill string components and the borehole are modeled using contact elements, each of which represents two surfaces which may maintain or break physical contact and may slide relative to each other. A contact element 55, shown in FIG. 3B, is capable of supporting only compression in the direction normal to the surfaces and shear (Coulomb) friction in the tangential direction, and have two degrees of freedom at each node: translations in the nodal x and y directions. Force and displacement constraints are applied to a node at each end of a drill string element and a contact element is attached to each node. The drill string is allowed to deflect laterally until it contacts the surface modeled by the contact element.

In particular, the WellDrill™ model of the drill string is created by entering data into the software to specify:
  (i) the outside and inside diameters of the drill pipe sections that make up the drill string,
  (ii) the locations of stabilizers,
  (iii) the length of the drill string,
  (iv) the inclination of the drill string,
  (v) the bend angle if a bent sub is used,
  (vi) the material properties, specifically the modulus of elasticity, material density, torsional modulus of elasticity, and Poisson's ratio,
  (vii) the mud properties for vibration damping, specifically, the mud weight and viscosity,
  (viii) the bore hole diameters along the length of the well obtained by adding an increment (e.g., 0.25 inch (6.4 mm)) to the diameter of the drill bit based on the type of formation,
  (ix) the azimuth, build rate and turn rate,
  (x) the diameter of the drill bit and stabilizers, and
  (xi) information concerning the characteristics of the formation, such as the strike and dip. These are used when the formation is a non-homogenous material, having different compressive strengths in orthogonal directions.

Strike is defined as the compass direction, relative to north, of the line formed by the intersection of a rock layer or other planar feature with an imaginary horizontal plane. The intersection of two flat planes is a straight line, and in this instance, the line is geologic strike. According to convention, the compass direction (or bearing) of this line is always measured and referred to relative to north. A typical bearing is given, for example, as N 45° E, which is a shorthand notation for a bearing that is 45° east of north (or half way between due north and due east). The only exception to this north rule occurs where strike is exactly east-west. Then, and only then, is a strike direction written that is not relative to north. Dip, as a part of the measurement of the attitude of a layer or planar feature, has two components: dip direction and dip magnitude. Dip direction is the compass direction (bearing) of maximum inclination of the layer or planar feature down from the horizontal and is always perpendicular (i.e., at a 90° angle) to strike. Dip magnitude is the smaller of the two angles formed by the intersection of the dipping layer or planar feature and the imaginary horizontal plane. However, dip magnitude can also be equal to either zero or 90°, where the layer or planar feature is horizontal or vertical, respectively.

From the data inputs specified above, the WellDrill™ software calculates the static deflection shape of the drill string so as to determine the points of contact between the drill string and the bore hole.

In addition, data are also entered into the WellDrill™ software specifying the expected operating parameters for (i) the WOB, (ii) the drill string RPM, (iii) the mud motor RPM, (iv) the diameter of the bore hole, and (v) the damping coefficient. The damping coefficient is calculated using a predetermined values of the viscosity of oil or water (depending on whether the operator indicates that an oil-based or water-based drilling mud is used), the density of the fluid (mud weight), and the annulus between the BHA and the bore hole. The bore hole diameter is estimated based on the diameter of the drill bit and the type of formation in lieu of not having caliper data. For example, if the formation is hard rock, the diameter of the bore hole may be estimated to be ½ inch larger than the diameter of the drill bit, whereas it may be estimated to be much larger than the drill bit for soft rock. (The maximum diameter is based on the number of cones or blades on the bit.) The diameter of the bore hole is also generally assumed to be bigger if a bent sub is used for rotary directional drilling.

As noted above, the WellDrill™ software performs static bending analysis to determine contact points between the drill string and the borehole. This provides support information for the vibration analysis. The static bending analysis determines the deflection, contact points, bending moments and the bending stress along the length of the drill string. The bending analysis is used to determine the predicted build and turn rate. The build rates are determined by a force balance at the drill bit. The critical speeds are determined by performing a forced harmonic frequency sweep. Excitation forces are applied at the bit and the power section of the mud motor. Wherever the excitation forces are near natural frequencies of the drill string, critical speeds occur.

In particular, the WellDrill™ software performs a forced response analysis by applying an oscillating WOB over a selected range of WOBs and drill bit RPMs. The selected oscillating WOB is applied at two frequencies: (i) the rotary speed of the drill bit and (ii) the number of cones (for roller cone bits) or blades (for PDC bits) multiplied by the drill bit speed. Since mud motors rotors are eccentric by design, they always create an oscillating imbalance force, the magnitude of which is based on the rotor eccentricity and the frequency of which is equal to N(n+1), where n is the number of lobes on the rotor and N is the mud motor rotor RPM. Therefore, if a mud motor is used, the software includes in the forced response analysis an oscillating imbalance force based on the characteristics of the mud motor applied at frequencies based on a selected range of mud motor RPM. Typical drill string rotary speeds are 10-250 rpm, while mud motor speeds may be 50-250 rpm. The typical bit speed (combination of motor and rotary speeds) is, therefore, 60 to 500 rpm. Mud turbines operate at much higher speeds of 800-1500 rpm, but do not introduce a similar imbalance. Drill collars may also have features, such as electronics hatches, upsets and cutout, that create a rotating imbalance. In addition, drill collars that become bent in service create a rotating imbalance. Since such rotating imbalances are a source of vibration excitation, WellDrill™ can include them in the model.

Based on the foregoing, the WellDrill™ software predicts critical drilling speeds for the drill string, motor and bit. Critical speeds occur when the drilling forces excite the drill string such that the induced vibration causes damage to the drill string and/or results in lost drilling performance. Drilling forces that may excite the drilling and induce critical speeds include: bit forces from the blades or cones of the bit striking a discontinuity, bit whirling in an over gauge bore hole, the imbalance forces generated by the motor stator, imbalance forces from the drill string the drill string contacting the bore hole resulting in whirling, and under-gauge stabilizers whirling. Typically, when the frequency of the excitation force is at or near a natural frequency of the drill string, the displacement amplitudes are easier to excite. In addition, in severe drilling applications the excitation forces away from the natural frequencies may be severe enough to damage the drillstring and require their identification as critical speeds.

The WellDrill™ software also calculates the torque at each section along the drill string using the equation:

$$T = \theta JG/L$$

Where:
T=torque
θ=angular displacement
J=polar moment of inertia
G=shear modulus
L=length of the drill string section WellDrill™ uses the calculated torque to determine torsional vibrations by determining whether the torque applied to the drill bit is sufficient to rotate the drill string backward. If this condition is present then it is considered a torsional critical speed. WellDrill™ also uses the calculated torque to determine stick-slip conditions, in particular, whether the torque along the drill string is sufficient to overcome frictional resistance to rotation.

Stick-Slip Software

Software has also been used in the past to predict when stick-slip will occur using a finite difference technique. First, the software calculates the drag along the entire length of the drill string and at the bit. The calculation of drag is based on the methodology described in C. A. Johancsik et al., *Torque And Drag In Directional Wells—Prediction and Measurement*, Journal of Petroleum Technology, 987-992 (June 1984), herein incorporated by reference in its entirety.

The previously used stick-slip prediction software breaks up the drill string into finite lengths, typically less than thirty feet. The drag on each section is a function of the normal force the section exerts on the wall of the borehole and the coefficient of sliding friction between the drill string and the wall. The normal force is a function of the curvature of the drill string section, the tension in the section, and gravity effects. The coefficient of friction is primarily a function of the characteristics of the drilling mud and whether the borehole is cased or open. Its value can be empirically developed by, for example, applying the model to a drill string in which the pickup weight, slack-off weight and torque are measured to establish independent measurements of drag.

The software calculates the drag on each section of drill string as the incremental moment, ΔM, necessary to overcome the friction force, from the equations:

$$\Delta F_n = [(F_t \Delta \alpha \sin \theta_A)^2 + ((F_t \Delta \theta + W \sin \theta_A)^2]^{1/2}$$

$$\Delta F_t = W \cos \theta_A \pm \mu F_n [\text{+ for upward motion, − for downward motion}]$$

$$\Delta M = \mu F_n r$$

Where:
$F_n$=net normal force acting on the section, lb-ft (N-m)
$F_t$=axial tension acting at the lower end of the section, lb-ft (N-m)
$\Delta F_t$=increase in tension over the length of section, lb-ft (N-m)
ΔM=increase in torsion over the length of section, ft-lb (N-m)
r=characteristic radius of the section, ft (m)
W=buoyed weight of the section, lb (N)
Δα=increase in azimuth angle over length of the section, degrees (rad)
Δθ=increase in inclination angle over length of section, degrees (rad)
$\theta_A$=average inclination angle of section, degrees (rad)
μ=sliding coefficient of friction between drill string and borehole The calculations start at the surface with an initial rotary speed of 0 rpm. The software uses the static friction coefficient when the pipe is stationary, and the sliding friction coefficient when it is moving relative to the borehole (sliding and/or rotating.). Normally the static friction is higher than the sliding friction. Next, the software calculates the torsional deflection in each section as a result of the incremental torque, ΔM, based on the mechanical properties of the section. The section properties depend on the outside and inside diameters of the section and its material density. These define the mass of the section and the rotational inertia of each section. If the sum of the incremental torques necessary to overcome the drag is greater than the torque applied to the drill string, at the surface, then the drill bit will "stick." The software then determines what values of WOB and drill string RPM, will result in stick-slip.

In addition, the software calculates the rotary inertia—that is, the incremental time it will take each section to deflect by that amount based on the mechanical properties of the section, in particular, the inside and outside diameter of the section and its mass, the applied torque and friction. The sum of these time increments over the length of the drill string represents the change in the instantaneous speed of the drill string, which is reported to operating personal for use, for example, in operating a rotary steerable tool or ensuring that the operating conditions are not damaging the drill bit.

While such predictions of resonant frequencies, mode shapes and stick slip provided in the past, as discussed above, can aid the operator in identifying those values of the drilling parameters, such as drill string RPM and WOB, to be avoided in order to avoid excessive vibration, they do not make use of real-time data as the drilling progresses nor adequately account for changes in drilling conditions over time. Neither do they provide methods for mitigating poor drilling performance, especially vibration-related losses in drilling performance, or for optimizing drilling efficiency, or for determining the remaining fatigue life of critical components. Their usefulness is, therefore, limited.

An ongoing need therefore exists for a system and method for providing the drill rig operator with accurate information concerning vibration based on actual operating data that will allow optimum performance and tool life.

SUMMARY OF THE INVENTION

In one embodiment, the invention encompasses a method, which may be computer implemented, of monitoring the operation of a drill string drilling into an earthen formation so as to form a bore hole using a drill bit, comprising the steps of: (a) drilling a bore hole having a first diameter in the earthen formation by rotating the drill bit at a first rotary speed and applying a first weight on the bit; (b) making a determination of the value of the first rotary speed at which the drill bit rotates; (c) making a determination of the value of the first weight on the bit; (d) making a determination of the value of the first diameter of the bore hole; (d) measuring vibration in the drill string at least one predetermined location along said drill string while rotating said drill bit at said first speed and applying the first weight on the bit; (e) using a finite element model of the drill string to predict the vibration in the drill string at the at least one predetermined location based on the determined values of the first rotary speed of the drill bit, the first weight on bit and the first bore hole diameter; (f) comparing the measured vibration to the predicted vibration and determining the difference therebetween; (g) revising the finite element model so as to reduce the difference between the measured vibration and the vibration predicted by the model; (h) drilling a bore hole having a second diameter in said earthen formation by rotating said drill bit at a second rotary speed and applying a second weight on said bit; (i) making a determination of the value of the second rotary speed at which said drill bit rotates; (j) making a determination of the value of said second weight on said bit; (k) making a determination of the value of said second diameter of the bore hole; (l) using the revised finite element model of the drill string to predict the vibration in the drill string based on the determined values of the second rotary speed of the drill bit, the second weight on bit and the second bore hole diameter.

In another embodiment, the invention encompasses a method, which may be computer implemented, for monitoring the operation of a drill string drilling into an earthen formation so as to form a bore hole using a drill bit located in a bottom hole assembly, comprising the steps of: a) determining the values of a plurality of operating parameters associated with the underground drilling operation by taking measurements from a plurality of sensors, at least a portion of the sensors located in the bottom hole assembly; b) determining from the determined values of the operating parameters whether each of a plurality of predetermined symptoms of lost drilling performance are present in the drilling operation; c) identifying the probability that each of the parameters determined to be present in the drilling operation are caused by each of a plurality of predetermined causes of lost drilling performance; d) combining the identified probabilities for each of the predetermined causes of lost drilling performance so as to determine the most likely cause of lost drilling performance present in the drilling operation.

In another embodiment, the invention encompasses a method, which may be computer implemented, for monitoring the operation of a drill string drilling into an earthen formation so as to form a bore hole using a drill bit, comprising the steps of: a) operating the drill string at a first set of operating parameters, the first set of operating parameters comprising the speed at which the drill bit rotates; b) determining the values of the parameters in the first set of operating parameters; c) inputting the determined values of the parameters in the first set of operating parameters into a finite element model of the drill string; d) using the finite element model of the drill string with the inputted values of the parameters to determine at least a portion of the vibratory mode shape of the drill string when operating at the first set of operating parameters; e) using the portion of the vibratory mode shape to determine the relationship between the amplitude of vibration at the first location to the amplitude of vibration at a second location when operating at the first set of operating parameters; f) measuring the amplitude of vibration of the drill string at the second location when operating at the first set of operating parameters; g) determining the amplitude of vibration of the drill string at the first location by applying to the measured vibration at the second location the relationship between the amplitude of vibration at the first location to the amplitude of vibration at a second location determined from the portion of the vibratory mode shape.

In another embodiment, the invention encompasses a method, which may be computer implemented, for monitoring the operation of a drill string drilling into an earthen formation so as to form a bore hole using a drill bit, comprising the steps of: a) applying a torque to the drill string at a location proximate the surface of the earth so as to rotate the drill string, the drill string undergoing angular deflection between the drill bit and the location at which the torque is applied; b) determining the values of parameters in a first set of operating parameters associated with the rotation of the drill string; c) inputting the determined values of the parameters in the first set of operating parameters into a finite element model of the drill string; d) using the finite element model of the drill string with the inputted values of the parameters to determine the angular deflection in the drill string at at least first and second locations along the length of the drill string when operating at the first set of operating parameters; e) using the angular deflections at the first and second locations along the drill string to determine the relationship between the torque on the drill string at the first and second locations; f) measuring the torque on the drill string at the second location when operating at the first set of operating parameters; g) determining the torque on the drill string at the first location by applying to the measured torque at the second location the relationship between the torque on the drill string at the first location to the torque on the drill string at the second location.

In another embodiment, the invention encompasses a method, which may be computer implemented, for monitoring the operation of a drill string drilling into an earthen formation so as to form a bore hole using a drill bit, comprising the steps of: a) rotating the drill bit at a first rotary speed so that the drill bit forms a bore hole in the earthen formation, the drill string vibrating in a lateral vibration mode; b) generating a signal representative of the vibration of the drill string in the lateral vibration mode as the drill bit drills into the earthen formation; c) analyzing the signal so as to determine the backward whirl frequency of the vibration of the drill string in the lateral vibration mode; d) determining the diameter of the bore hole being drilled by the drill bit from the backward whirl frequency.

In another embodiment, the invention encompasses a method, which may be computer implemented, for monitoring the operation of a drill string drilling into an earthen formation so as to form a bore hole using a drill bit, comprising the steps of: a) determining a set of operating parameters for the drill string that will result in the maximum rate of penetration of the drill bit into the earthen formation; b) inputting the set of operating parameters into a finite element model of the drill string; and c) using the finite element model with the inputted set of operating parameters to predict the vibration in the drill string that will result from operation of the drill string according to the set of operating parameters.

In another embodiment, the invention encompasses a method, which may be computer implemented, for monitoring the operation of a drill string drilling into an earthen formation so as to form a bore hole using a drill bit, comprising the steps of: a) obtaining a data base relating sets of operating parameters for the drill string to rates of penetration of the drill bit into the earthen formation when operating at the sets of operating parameters; b) using a finite element model of the drill string and the data base to predict the maximum rate of penetration of the drill string into the earthen formation that will not result in the vibration in the drill string violating a predetermined criteria.

In another embodiment, the invention encompasses a computer-readable storage medium having stored thereon computer-executable instructions for performing the aforementioned methods.

BRIEF DESCRIPTION OF THE DRAWINGS

The foregoing summary, as well as the following detailed description of a preferred embodiment, are better understood when read in conjunction with the appended diagrammatic drawings. For the purpose of illustrating the invention, the drawings show embodiments that are presently preferred. The invention is not limited, however, to the specific instrumentalities disclosed in the drawings.

FIG. 6 is a flowchart of a method for revising the drill string model to reduce deviations between predicted and measured critical speeds.

DESCRIPTION OF PREFERRED EMBODIMENTS

Figure 1:
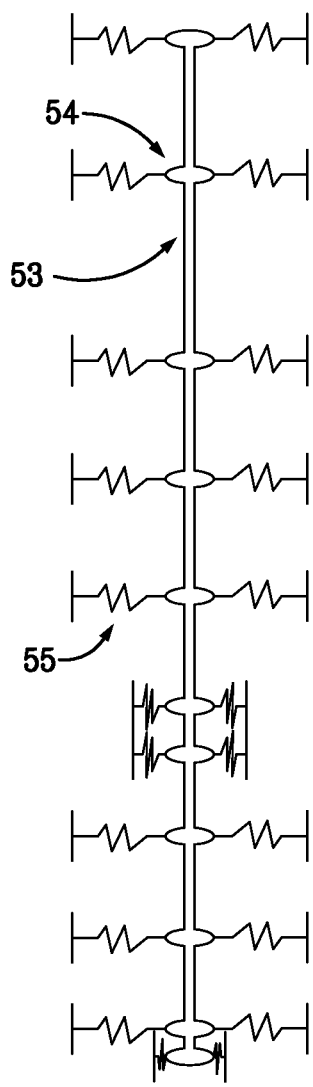
FIG. 1 is a schematic diagram of a finite element model used to model a drill string.
Figure 2:
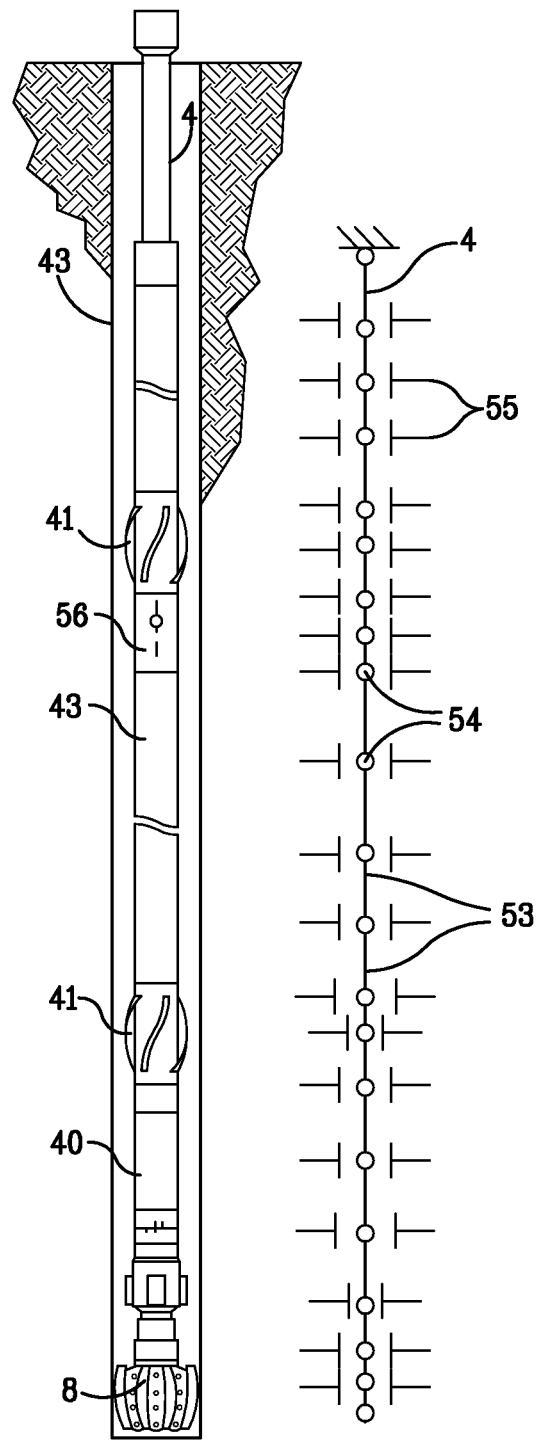
FIG. 2 is a schematic diagram of a finite element model of a drill string.
Figure 3A:
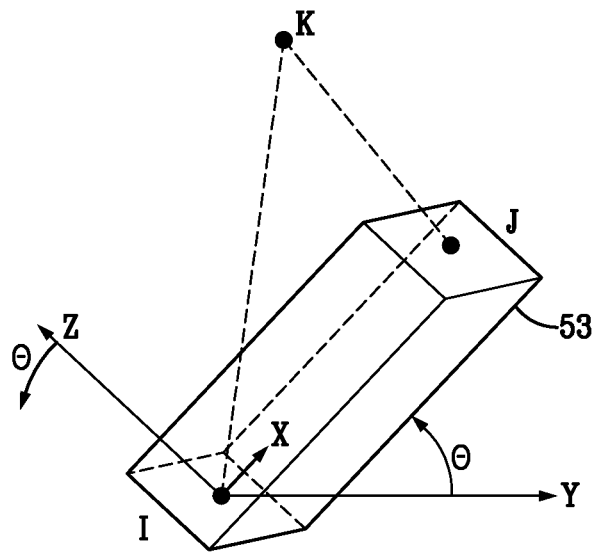
FIGS. 3A and B are schematic diagrams of beam and contact elements used in the finite element model of the drill string.
Figure 3B:
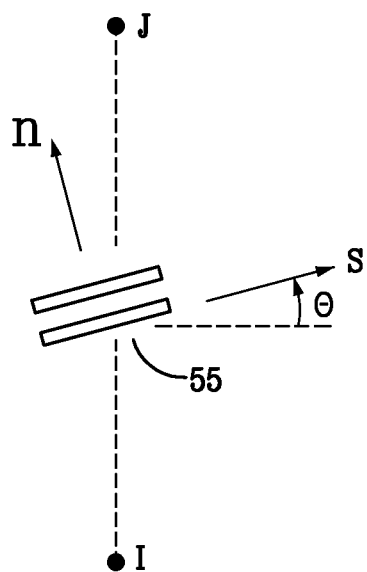
Figure 4:
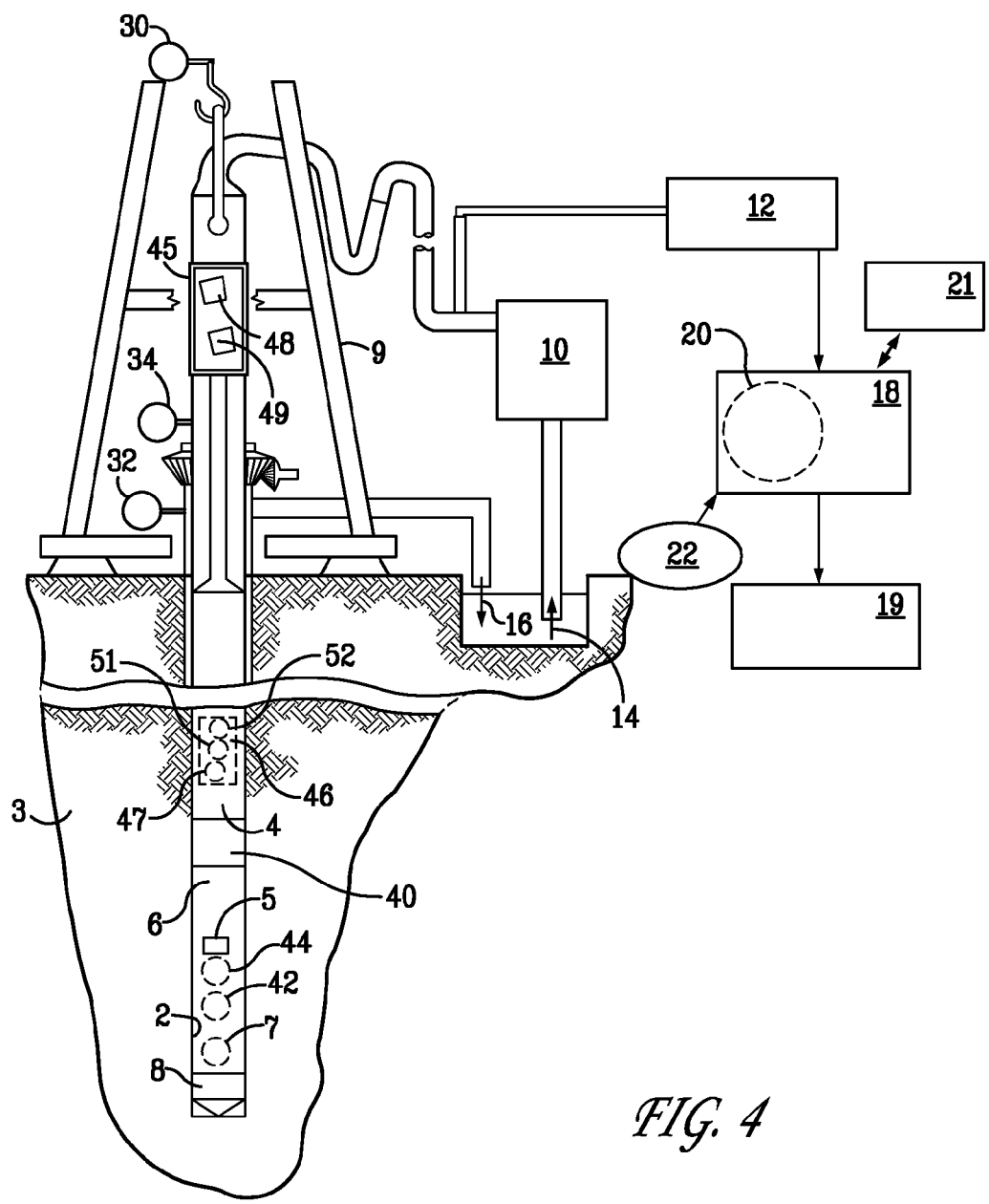
FIG. 4 is a view, partly schematic, of a drilling rig incorporating the current invention.

As shown in FIG. 4, drill rigs typically comprise a derrick 9 that supports a drill string 4. A drill bit 8 is coupled to the distal end of a bottomhole assembly 6 of the drill string 4. A prime mover (not shown), such as a top drive or rotary table, rotates the drill string 4 so as to control the rotational speed (RPM) of, and torque on, the drill bit 8. As is conventional, a pump 10 pumps a fluid 14—typically referred to as drilling mud—downward through an internal passage in the drill string. After exiting at the drill bit 8, the returning drilling mud 16 flows upward to the surface through an annular passage formed between the drill string 4 and the bore hole 2 in the earthen formation 3. A mud motor 40, such as a helicoidal positive-displacement pump—sometimes referred to as a "Moineau-type" pump—may be incorporated into the bottomhole assembly 6 and is driven by the flow of drilling mud 14 through the pump. A helicoidal positive-displacement pump is described more fully in U.S. Pat. No. 6,102,681, entitled "Stator Especially Adapted For Use In A Helicoidal Pump/Motor," hereby incorporated by reference herein in its entirety.

A. Instrumentation and Hardware

1. Downhole Instrumentation

According to the current invention, preferably, downhole strain gauges 7 are incorporated into the bottomhole assembly 6 to measure the WOB. A system for measuring WOB using downhole strain gauges is described in U.S. Pat. No. 6,547,016, entitled "Apparatus For Measuring Weight And Torque An A Drill Bit Operating In A Well," hereby incorporated by reference herein in its entirety. In addition to downhole sensors measuring the WOB, downhole sensors, such as strain gauges, measuring the torque on bit ("TOB") and the bending on bit ("BOB") are also included in the bottomhole assembly. Techniques for downhole measurement of TOB are also described in the aforementioned U.S. Pat. No. 6,547,016, incorporated by reference above. Techniques for the downhole measurement of BOB are described in U.S. application Ser. No. 12/512,740, filed Jul. 30, 2009, entitled "Apparatus for Measuring Bending on a Drill Bit Operating in a Well," hereby incorporated by reference in its entirety. A sub incorporating WOB, TOB and BOB sensors is referred to as a "WTB sub."

A magnetometer 42 is incorporated into the bottomhole assembly 6 that measures the instantaneous rotational speed of the drill bit 8, using, for example, the techniques in U.S. Pat. No. 7,681,663, entitled "Methods And Systems For Determining Angular Orientation Of A Drill String," hereby incorporated by reference herein in its entirety. Accelerometers 44, oriented along the x, y, and z axes (typically with ±250 g range), are incorporated into the bottomhole assembly 6 that, using techniques well known in the art, measure axial and lateral vibration. Although accelerometers 44 are shown in only one location in FIG. 4, as is conventional, sets of three x, y, z accelerometers would be installed at various locations along the drill string 4.

A Vibration Memory Module™ 46, discussed above, is preferably incorporated into the bottomhole assembly 6. It receives data from the accelerometers 44 installed into the bottomhole assembly 6, from which it determines the amplitude and frequency of axial vibration, and of lateral vibration due to forward and backward whirl, at the location of the accelerometers. These values are transmitted to the surface via a mud pulse telemetry system, discussed below. Alternatively, the information could be transmitted to the surface using a wired pipe system, such as Intellipipe, or other means such as acoustic or electromagnetic transmission. The Vibration Memory Module™ 46 also receives data from the magnetometer 42 incorporated into the bottomhole assembly 6, from which it measures the instantaneous rotational speed of the drill string at the magnetometer 42 location. It then determines the amplitude and frequency of torsional vibration due to stick-slip by determining the difference between and maximum and minimum instantaneous rotational speed of the drill string over a given period of time. This information is also transmitted to the surface via the mud pulse telemetry system. According to the current invention, a memory device 47, such as a micro-chip, is incorporated into the Vibration Memory Module™ 46 to record the fatigue life remaining in the component, as discussed in section 10, below, concerning life prediction. In addition, pressure sensors 51 and 52 are incorporated into the Vibration Memory Module™ 46 that measure the pressure of the drilling mud flowing through the drill string and the pressure of the drilling mud flowing through the annular gap between the bore hole wall and the drill string, respectively.

2. Surface Instrumentation

As is conventional, the WOB is controlled by varying the hook load on the derrick 9. A top sub 45 is incorporated at the top of the drill string and encloses strain gauges 48 that measure the axial (hook) load, as well as the bending and torsional load on the top sub, and a triaxial accelerometer 49 that senses vibration of the drill string. Using techniques well known in the art, the WOB can be calculated from the hook load measured by the strain gauges in the top sub, for example, by subtracting the frictional resistance acting on the drill string from the measured hook load. The value of the frictional resistance can be obtained by pulling up on the drill string so that the drill bit is no longer contacting the formation and noting the change in the hook load. In a wired pipe, the data from the downhole sensors would be received by the top sub 45. The data from the top sub 45 strain gauges, as well as the downhole sensors in a wired pipe system, can be transmitted via wireless telemetry to the surface acquisition system 12 using the technique disclosed in U.S. application Ser. No. 12/389,950, filed Feb. 20, 2009, entitled "Synchronized Telemetry From A Rotating Element," hereby incorporated by reference in its entirety.

Preferably, the surface monitoring system also includes a hook load sensor 30 for determining WOB. The hook load sensor 30 measures the hanging weight of the drill string, for example, by measuring the tension in the draw works cable using a strain gauge. The cable is run through three supports. The supports put a known lateral displacement on the cable. The strain gauge measures the amount of lateral strain due to the tension in the cable, which is then used to calculate the axial load. A sensor 32 is also used for sensing drill string rotational speed.

3. Data Transmission and Processing

The drilling operation according to the current invention also includes a mud pulse telemetry system, which includes a mud pulser 5 incorporated into the downhole assembly 6. Using techniques well known in the art, the mud pulse telemetry system encodes data from downhole equipment, such as vibration information from the Vibration Memory Module™, and, using the pulser 5, transmits the coded pulses to the surface. Mud pulse telemetry systems are described more fully in U.S. Pat. No. 6,714,138, entitled "Method And Apparatus For Transmitting Information To The Surface From A Drill String Down Hole In A Well," U.S. Pat. No. 7,327,634, entitled "Rotary Pulser For Transmitting Information To The Surface From A Drill String Down Hole In A Well," and U.S. Patent Application Publication No. 2006/0215491, entitled "System And Method For Transmitting Information Through A Fluid Medium," each of which is incorporated by reference herein in its entirety.

According to the current invention, to reduce data transmissions, data, such as vibration information, may be grouped into ranges and simple values used to represent data in these ranges. For example, vibration amplitude can reported as 0, 1, 2 or 3 to indicate normal, high, severe, or critical vibration, respectively. One method that may be employed to report frequency is to assign numbers 1 through 10, for example, to values of the vibration frequency so that a value of 1 indicates a frequency in the 0 to 100 hz range, a value of 2 indicates frequency in the 101 to 200 hz range, etc. The mode of vibration may be reported by assigning a number 1 through 3 so that, for example, a value of 1 indicates axial vibration, 2 indicates lateral vibration, and 3 indicates torsional vibration. If only such abbreviated vibration data is transmitted to the surface, at least some of the data analysis, such as the Fourier analysis discussed below in connection with the use of backward whirl frequency to determine the borehole diameter, would be performed in a processor installed in the bottom hole assembly.

As is also conventional, a data acquisition system 12, such as a SureShot™ system, discussed above, at the surface senses pressure pulsations in the drilling mud 14 created by the mud pulser 5 that contain encoded information from Vibration Memory Module™ and other sensors in the bottomhole assembly 6. The data acquisition system 12 decodes this information and transmits it to a computer processor 18, also preferably located at the surface. Data from the surface sensors, such as the hook load sensor 30, the drill string rotational speed sensor 32, and the ROP sensor 34 are also transmitted to the processor 18.

Software 20, which includes the WellDrill™ software and stick-slip software discussed above, as well as software for performing the methods described herein, discussed below, is preferably stored on a non-transitory computer readable medium, such as a CD, and installed into the processor 18 that executes the software so as to perform the methods and functions discussed below. The processor 18 is preferably connected to a display 19, such as a computer display, for providing information to the drill rig operator. A data entry device 22, such as a keyboard, is also connected to the processor 18 to allow data to be entered for use by the software 20. A memory device 21 is in communication with the processor 18 so that the software can send to data to, and receive data from, storage when performing its functions. The processor 18 may be a personal computer that preferably has at least a 16×CD-ROM drive, 512 MB RAM, 225 MB of free disk space, a graphics card and monitor capable of 1024×786 or better at 256 colors and running a Windows XP™ operating system. Although the processor 18 executing the software 20 of the current invention is preferably located at the surface and can be accessed by operating personnel, portions of the software 20 could also be installed into a processor located in the bottomhole assembly so that some of the operations discussed below, such as a Fourier analysis of vibration data, could be performed downhole.

B. Software

1. Drill String Modeling

As discussed more fully below, the current invention makes use of the WellDrill™ software, discussed above. WellDrill™ can be employed in performing the methods of the current invention because it does a much better job of modeling the sources of vibration and the excitation forces than other programs. Most other programs predict the fundamental natural frequencies and base the mode shapes on this but do not take into account the whether the amplitudes and accelerations are sufficient to cause damage. WellDrill™ relies on a forced harmonic analysis that accurately models the excitation forces and their applied frequencies. It also considers additional sources of vibration such as mud motor imbalances, bent collars and drill string imbalances.

Figure 5A:
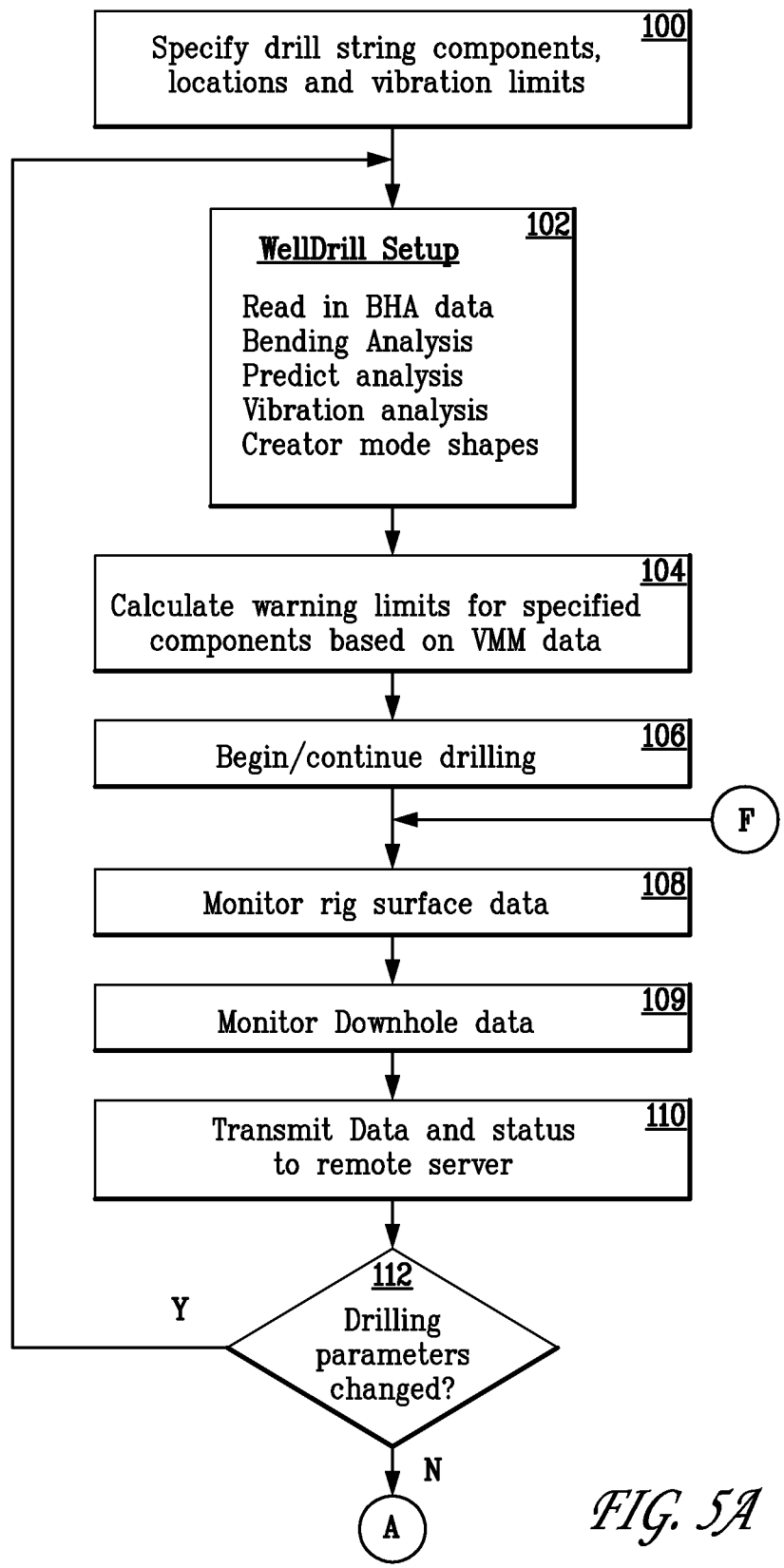
FIG. 5A is a flowchart of the method of operating a drill string that is the subject of the current invention.

The operation of the system for monitor and controlling the drilling operation according to the invention is shown in FIG. 5A. In step 100, the operator begins by specifying the significant drill string components—such as a Measurement While Drilling ("MWD") tool—and the vibration limits applicable to each such component. This information is input into the WellDrill™ software, discussed above, in step 102 along with data on the bottomhole assembly. The data input into WellDrill™ may include:

(i) the outside and inside diameters of the drill pipe sections that make up the drill string,
(ii) the locations of stabilizers,
(iii) the length of the drill string,
(iv) the inclination of the drill string,
(v) the bend angle if a bent sub is used,
(vi) the material properties, specifically the modulus of elasticity, material density, torsional modulus of elasticity, and Poisson's ratio,
(vii) the mud properties for vibration damping, specifically, the mud weight and viscosity,
(viii) the bore hole diameters along the length of the well,
(ix) the azimuth, build rate and turn rate,
(x) the diameter of the drill bit and stabilizers, and
(xi) information concerning the characteristics of the formation, such as the strike and dip.

The information on the drill string components can also be updated by the operator each time a new section of drill string is added. As discussed above, data are also entered into the WellDrill™ software specifying the expected operating parameters, such as those for (i) the WOB, (ii) the drill string RPM, (iii) the mud motor RPM, (iv) the diameter of the bore hole, and (v) the damping coefficients. In step 102 the WellDrill™ software also performs a static bending analysis in which it calculates the BHA deflections, the side forces along the length of the BHA, the bending moments and the nominal bending stress, as well as a "predict analysis" in which it uses the bending information to predict the direction in which the drill string will drill.

In step 104, the software calculates vibration warning limits for specific components based on the data from the sensors in the Vibration Monitoring Module™. For example, as discussed below, based on the predicted mode shapes, the software can determine what level of measured vibration at the accelerometer locations would result in excessive vibration at the drill string location of a critical component. In steps 108 and 109, the software receives data from the rig surface and downhole sensors so that such data can be used by the software on an on-going basis during the drilling operation, as discussed below. Data from the surface sensors are preferably transmitted to the system 12 continuously. Data from the downhole sensors are transmitted to the system 12 whenever data are sent to the surface, preferably at least every few minutes. In step 110, data and status are transmitted to a remote server to allow users who are not at the well site to download and review the data, for example by logging into the server via the internet. In step 112, the software determines whether any of the drilling parameters input into WellDrill™ have changed and, if so, it updates the WellDrill™ inputs and the model is revised accordingly.

Figure 5B:
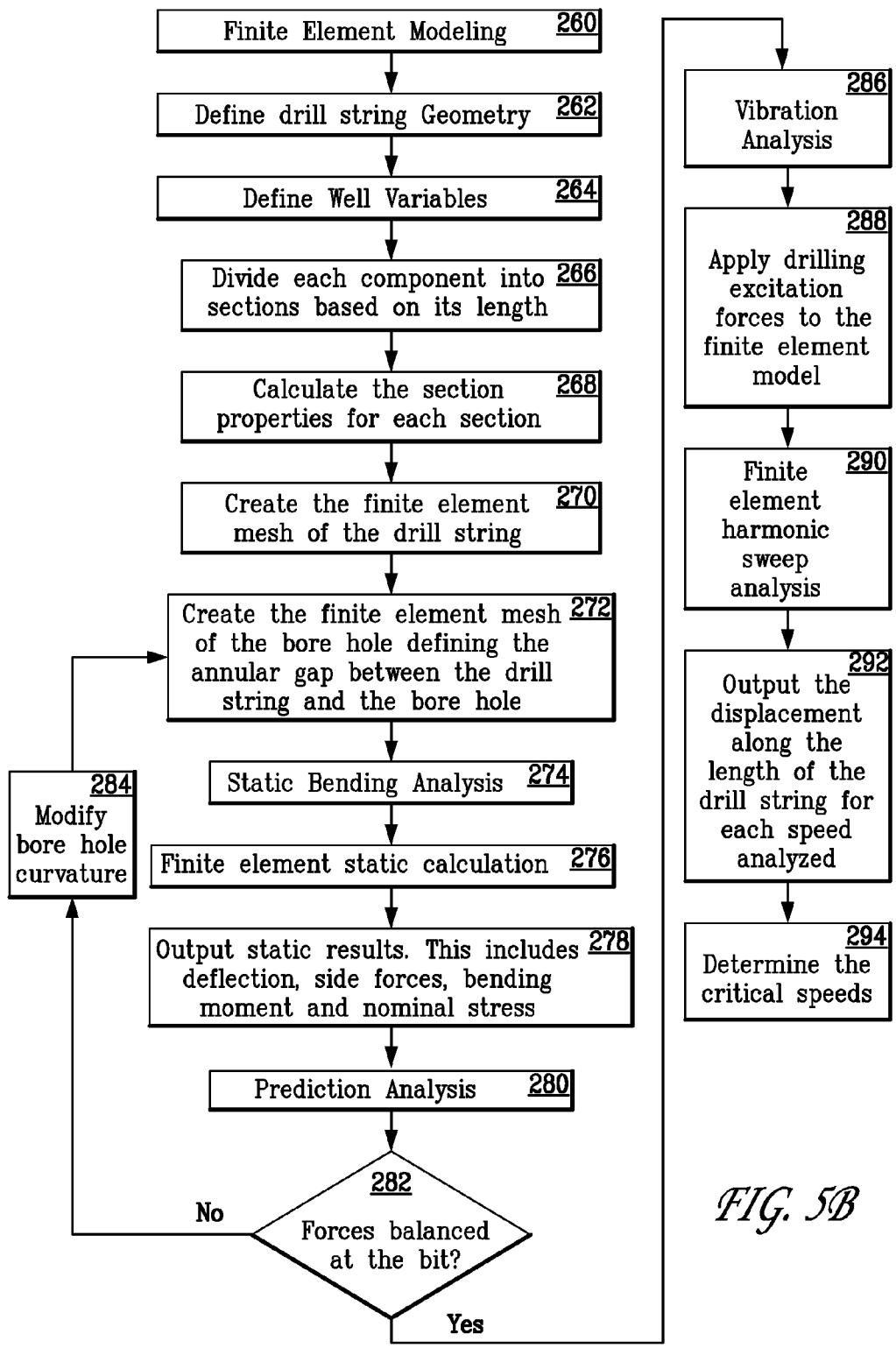
FIG. 5B is a flowchart of the method of creating a model of the drill string using the WellDrill™ software.

FIG. 5B shows the method of creating the model of the drill string using the WellDrill™ software. In steps 260 to 272, the components of the drill string are modeled using the ANSYS finite element technique, as previously discussed.

The aforementioned static bending analysis and predict analysis are performed in steps 274 to 280. In step 282, the software determines whether the forces are balanced at the bit—that is, whether the side forces on the bit are equal to zero. If the forces are not balanced, then in step 284 the curvature of the borehole is modified and steps 272 to 282 re-run until a balance is obtained in step 282. In steps 286 to 294, a vibration analysis is performed by applying the drilling exciting forces to the model over a harmonic sweep and the resulting displacement along each portion of the drill string is analyzed to determine the critical speeds.

Thus, the WellDrill™ model is set up by first defining those drillstring and the well parameters that are not subject to changing during the run. These are stored by the software. As certain drilling conditions change these are modified in the WellDrill™ program and the analysis re-run. Variables that change during drilling include: RPM, WOB, inclination, depth, azimuth, mud weight, and bore hole diameter. The model is updated as the operating conditions change. Thus, unlike what was done in the past, according to the current invention, the WellDrill model is automatically updated based on real-time values of operating parameters based on the measurements of the surface and down hole sensors. As explained below, the WellDrill™ software then calculates the critical speeds for a range of WOBs. These are displaced on a Critical Speed Map. The Critical Speed Map has RPM on the x-axis and WOB on the y-axis, and is therefore useful for a combination of conditions. Mode shapes at any given RPM and WOB combination can also be displayed.

2. Real-Time Determination of Bore Hole Size

As discussed above, in the past the bore hole diameter used in the WellDrill model was based on an assumed value input by the operator, taking into account the diameter of the drill bit and type of formation. In the preferred embodiment of the invention, the real-time borehole diameter used in the model is calculated by the software 20 from the backward whirl frequency. The backward whirl frequency can be calculated as follows:

$$BWF = (d \times w)/(D-d)$$

Where:
BWF=backward whirl frequency.
D=borehole diameter.
d=diameter of the drill bit or the diameter of another component if the static bending analysis performed by the WellDrill™ software determined that such other component was contacting the bore hole wall.

w=rotary speed of the drill bit (for bit whirl) or the drill string (for drill string whirl)

Therefore, if the whirl frequency is known, the diameter of the real-time borehole can be calculated from the equation:

$$D=d\times(1+w/\text{BWF})$$

The software 20 determines the backward whirl frequency by performing a Fourier analysis of the burst output of the lateral acceleration accelerometer 44, with the backward whirl frequency taken to be the frequency at which the Fourier analysis depicts a peak at or near the predicted whirling frequency. The expected whirling frequency can initially be estimated from the equation above, using the bit diameter and the expected bore hole diameter. Such a Fourier analysis can be performed by the processor 18 at the surface after the vibration data has been transmitted to the surface by either a mud pulse telemetry system or a wired pipe or other transmission system, as previously discussed. Alternatively, the Fourier analysis could be performed downhole by incorporating into the BHA, for example into an MWD tool, a processor programmed, using techniques well know in the art, to perform Fourier analyses. The vibration data necessary to perform the Fourier analysis of the lateral vibration accelerometer output would be transmitted to the downhole processor by the Vibration Memory Module™

3. Prediction of Critical Speeds

As indicated in connection with step 102, using WellDrill™, the software 20 performs a vibration analysis in which it predicts (i) the natural frequencies of the drill string in axial, lateral and torsional modes and (ii) the critical speeds of the drill string, mud motor (if any), and drill bit that excite these frequencies, as previously discussed. However, unlike what was done in the past, the software 20 also adjusts the WellDrill™ model if the actual critical speeds don't match the prediction so that the model correctly predicts the critical speeds experienced by the drill string. The method shown in FIG. 6 can be used to adjust the model if it predicts a critical speed at an RPM that actual operation reveals does not result in resonant vibration. If a critical speed is encountered at an RPM at which the WellDrill™ model does not predict resonant vibration, then the model can be adjusted using the method discussed in section 9 after the successful elimination of high vibration that caused a loss of drilling performance.

As shown in FIG. 6, the software first determines in step 330 whether a predicted critical speed differs from a measured critical speed by more than a predetermined amount. If it does, in step 332, the software determines whether the vibratory mode associated the critical speed was related to the axial, lateral or torsional vibratory mode. If the critical speed was associated with the torsional or axial modes, then in step 334 the software determines if the RPM at which the mud motor is thought to be operating, without encountering the predicted resonant vibration, is on the lower end of the predicted critical speed band. If it is, then in step 336 the motor RPM used by the model is decreased until the critical speed is no longer predicted. If it determines that the motor RPM is on the upper end of the predicted critical speed band, then in step 338 the motor RPM is increased until the critical speed is no longer predicted. If the mud motor is not being used, then in step 340 the software determines whether the predicted critical speed is higher or lower than the speed at which the drill bit is operating. If it is higher, then in step 342 the drill string stiffness is decreased until the critical speed is no longer predicted. If it is lower, then in step 344, the drill string stiffness is increased until the critical speed is no longer predicted.

If the critical speed was associated with the lateral vibratory mode, then in step 346 the software determines if the lateral vibration is due to drill bit, mud motor, or drill string lateral vibration. If the lateral vibratory mode is associated with the drill string, then in step 348 the software determines whether the RPM at which the drill string is thought to be operating, without encountering resonance, is on the lower or higher end of the predicted critical speed band. If it is on the high end, then in step 350 the drill string speed used in the model is reduced or, if that is unsuccessful, a stabilizer OD is increased. If it is on the low end, then in step 352 bore hole size used in the model is increased or, if that is unsuccessful, the OD of a stabilizer is decreased.

If the lateral vibratory mode is associated with the mud motor, then in step 354 the software determines whether the RPM at which the mud motor is thought to be operating, without encountering resonant vibration, is on the lower or higher end of the predicted critical speed band. If it is on the high end, then in step 356 the mud motor speed used in the model is increased until the critical speed is no longer predicted. If it is on the low end, then in step 358 the mud motor speed used in the model is decreased until the critical speed is no longer predicted. If the lateral vibratory mode is associated with the drill bit, then in step 360 the software determines whether the RPM at which the drill is thought to be operating is on the lower or higher end of the critical speed band. If it is on the high end, then in step 362 the drill bit speed is decreased until the critical speed is no longer predicted. If it is on the low end, then in step 364 the drill bit speed is increased until the critical speed is no longer predicted.

4. Prediction of Vibration and Extrapolation of Measured Vibration to Vibration at Critical Components As also indicated in connection with step 102, using WellDrill™, discussed above, the software 20 performs vibration analyses, including predicting the mode shapes resulting from axial, lateral and torsional vibration based on the current measured operating parameters. Although the software 20 uses WellDrill™ to predict vibration and calculate the mode shapes, unlike what was done in the past, the software of the current invention automatically determines the mode shape at the measured values of the real-time operating parameters.

In the preferred embodiment, the software predicts vibration at each element along the drill string based on the real time values of: (i) WOB, (ii) drill bit RPM, (iii) mud motor RPM, (iv) diameter of borehole, (v) inclination, (vi) azimuth, (vii) build rate, and (viii) turn rate. For purposes of predicting vibration, WOB is preferably determined from surface measurements using the top drive sub 45, as previously discussed, although downhole strain gauges could also be used as also previously discussed. Drill bit RPM is preferably determined by summing the drill string RPM and the mud motor RPM. The drill string RPM is preferably based on a surface measurement using the RPM sensor 32. The mud motor RPM is preferably based on the mud flow rate using a curve of mud motor flow rate versus motor RPM or an RPM/flow rate factor, as previously discussed. The diameter of the bore hole is preferably determined from the backward whirl frequency as discussed in section 2, above, although an assumed value could also be used, as also previously discussed. Inclination and azimuth are preferably determined from accelerometers 44 and magnetometers 42 in the BHA, as previously discussed. Build rate is preferably determined based on the change in inclination. Turn rate is determined from the change in azimuth. Preferably, the information on WOB, drill string RPM and mud motor RPM is automatically sent to the processor 18 for use by the software 20 by the SureShot™ surface system, discussed above. Information on inclination and azimuth, as well as data from the lateral vibration accelerometers (the backward whirl frequency if the Fourier analysis is performed downhole), are transmitted to the processor 18 by the mud pulse telemetry system or a wired pipe or other transmission system at regular intervals or when requested by the software 20 or when triggered by an event.

According to the current invention, three oscillating excitation forces are used to predict vibration levels: (i) an oscillating excitation force the value of which is the measured WOB and the frequency of which is equal to the speed of the drill bit multiplied by the number of blades/cones on the bit (this force is applied at the centerline of the bit and excites axial vibration), (ii) an oscillating force the value of which is the measured WOB and frequency of which is equal to the number of vanes (or blades) on drill bit times the drill bit speed (this force is applied at the outer diameter of the bit and creates a bending moment that excites lateral vibration), and (iii) an oscillating force the value of which is the calculated imbalance force based on the characteristics of the mud motor, as previously discussed, and the frequency of which is the frequency of which is equal to N (n+1), where N is the rotary speed of the rotor and n is the number of lobes on the rotor.

Figure 7:
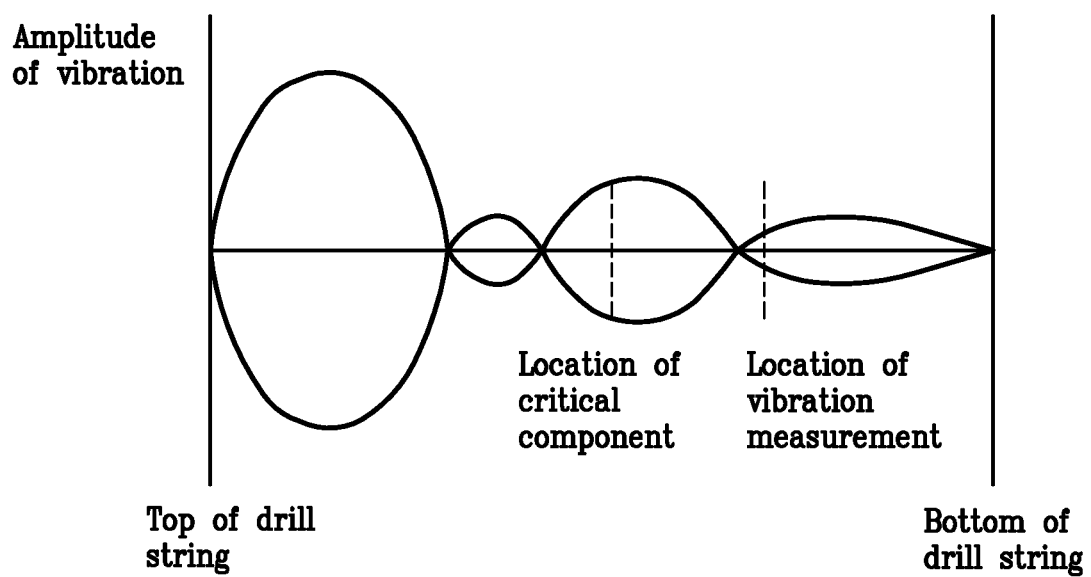
FIG. 7 is a hypothetical vibratory mode shape curve generated using the software of the current invention.

Based on the foregoing, WellDrill calculates the amplitude and frequency of the vibration at teach point along the drill string. A plot of such data, such as that shown in FIG. 7 shows, for the current operating condition, the vibratory mode shape of the drill string, which is essentially the relative amplitude of vibration along the drill string.

Vibration amplitude is measured only at the locations of vibration sensors, such as accelerometers. However, of importance to the operator is the vibration at the location of critical drill string components, such as an MWD tool. Since the software 20 predicts mode shape, and knows the location of such critical components, in step 104 it determines the ratio between the amplitude of vibration at a nearby sensor location and the amplitude of vibration at the critical component for each mode of vibration. Based on the inputted vibration limit for the component, it determines the vibration at the sensor that will result in the vibration at the component reaching its limit. It will then issue a high vibration alarm if the vibration at the sensor reaches the correlated limit. For example, if the maximum vibration to which an MWD tool should be subjected is 5 g and the mode shape analysis indicates that, for lateral vibration, the ratio between the vibration amplitude at sensor #1 and the MWD tool is 1.5—that is, the amplitude of the vibration at the MWD tool is 1.5 times the amplitude at sensor #1, the software would advise the operator of the existence of high vibration at the MWD tool if the measured lateral vibration at sensor #1 exceeded 1.33 g. This extrapolation could be preformed at a number of locations representing a number of critical BHA components, each with its own vibration limit.

In addition to predicting vibration along the length of the drill at current operating conditions in order to extrapolate measured vibration amplitudes to other locations along the drill string, the software can also predict vibration along the length of the drill string based on projected operating conditions so as to allow the software to determine whether a change in operating parameters, such as RPM or WOB, will affect vibration.

5. Prediction of Torque and Stick-Slip and Extrapolation of Measured Torque to Torque at Critical Components Using the methodology discussed above, the vibration analysis performed in step 102 also includes a calculation of the torque at each section along the drill string and a prediction as to when stick-slip will occur. For stick-slip, torque is the important load as this may result in connections over-torqueing, backing off, or unscrewing due to the oscillating torsion loads. In addition to analyzing torsional vibration during drilling, the software analyzes the operating parameters to determine if an over-torqueing or reverse over-torqueing situation is occurring at any location along the length of the drill string.

Due to vibrations and stick-slip conditions, the RPM along the drill string varies. The long length of the drill string, along with the applied torque at the bit and on the drill string, will result in the drill string winding up many times between the surface and the bit. Vibrations and stick-slip conditions result in the drill string oscillating along its length. The drill string may be rotating at a given RPM at one location and rotating at a different RPM at other locations along its length. The drill string may stop rotating at some locations and even rotate in the reverse direction.

In a preferred embodiment, the instantaneous RPM is measured using magnetometers in the BHA, which measure RPM at 400 Hz. Preferably, the software advises the operator if these readings indicate excessive variation in instantaneous RPM. In particular, RPM is calculated by the phase change to earth's magnetic field as seen by the magnetometer. The magnetometers measure the phase change of the earth's magnetic field as the magnetometer rotates within the drill collar. The magnetometer measures the angular position of the collar at a given time. Therefore the change in angular position is measured from one time step to the next.

The WellDrill™ software is used to predict the oscillating angular displacement ($\theta$) at positions along the length of the drill string using finite element techniques for forced vibration such as the Bernoulli-Euler beam theory. In the preferred embodiment, the maximum torque at the bit is assumed to be calculated from the WOB×the bit radius×a bit factor. The bit factor is the ratio of the torsional force generated by the cutters/WOB. The oscillating frequency is assumed to be the rpm of the drill string×the number of cutters or blades on the bit. The minimum force is assumed to be 0 torque. However other torque ranges may be used.

Stick-slip is also a source of oscillating torque. Finite difference equations, discussed above in the section entitled Stick-Slip Software, are used to calculate the angular displacements at time intervals along the length of the drill string. The angular displacement along the length of the drill string is the combined static displacement due to bit torque and drag torque with the oscillating torque. (The value of the full bit torque can be obtained from information provided by the bit supplier, such as drill bit torque itself or a bit factor, which is the ratio of the bit torque to WOB.) The value for the oscillating RPM predicted at the location of the magnetometer in the bottom hole assembly is then compared to the oscillating RPM data from the magnetometer itself. If the two values do not agree within a predetermined amount, for example 10%, then the methodology discussed below in connection with FIG. 11 (whirl) is used to adjust the WellDrill™ model and the analysis is re-run.

The WellDrill™ software also calculates the steady torque along the length of the drill string based on the applied torque at the bit and friction drag effects along the drill string. The WOB, inclination, build and turn rates affect the gravity effects on the tool, which, in turn, determine the amount of drag along the length of the drill string and, in turn, the torque along the drill string. Combining both the steady torque and the vibratory torque yields the maximum torque experienced at each element of the drill string.

Based on the angular displacements along the drill string calculated as discussed above, the software determines the torque at each location along the drill string from the equation:

$$T=(\Delta\theta \times J \times G)/L$$

Where:
Δθ=the angular displacement across each element
G=the shear modulus of the element
J—the polar moment of inertia of the element
L=the length of the element If a WTB sub, as described above, is used, the torque at a specific location is directly measured, for example, by the strain gauges in the WTB sub as discussed in the aforementioned U.S. Pat. No. 6,547,016 incorporated by reference above. Use of a top sub, also described above, will result in the measurement of the torque at the surface. If neither a top sub nor a WTB sub is used, then the torque at the Vibration Memory Module™ can be calculated by the change in instantaneous speed and the mass at that section.

Regardless of how toque is measured, using the prediction of torque along the length of the drill string, the software extrapolates the torque at the measured location to other locations along the length of the drill string. For example, based on the torque predicted by WellDrill™ for the operating parameters being experienced, the torque at a particular drill pipe joint may be predicted to be 1.5 time greater than at the WTB sub. The torque value measured at the WTB sub would then be increased by a factor of 1.5 to predict the toque at the pipe joint.

Figure 10:
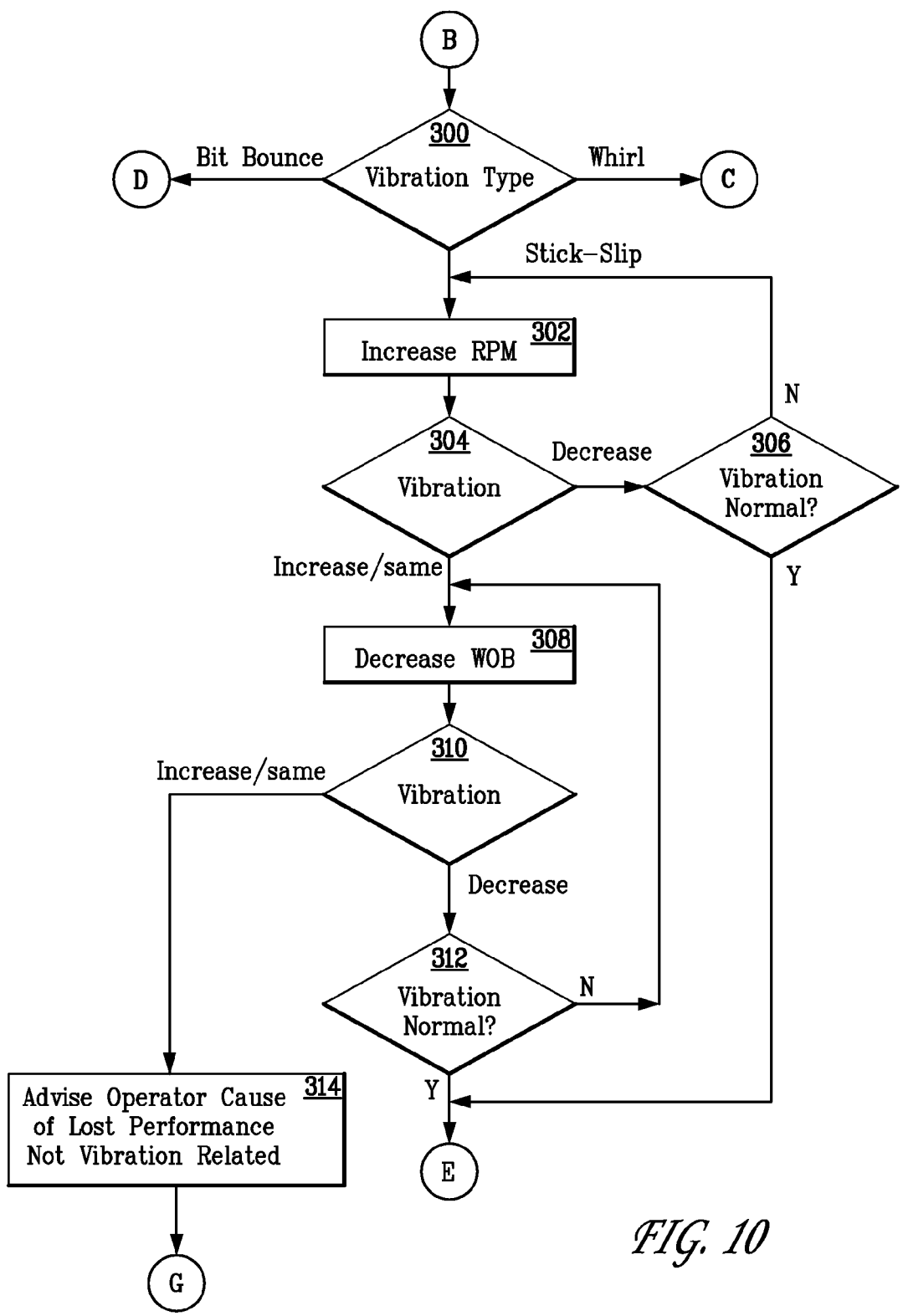
FIGS. 10-12 are flowcharts of the method of mitigating lost performance in drill performance, due to vibration, according to the current invention.

Allowable torque limits for critical drill string components can be input into the software 20 and stored in the memory 21 of the processor 18. Such limits are usually available from piping, heavy weight and drill collar specifications. During operation, the software 20 compares the predicted value of the torque at the critical locations to the limit set for the components at those location to determine if an over-torque condition exists and, if so, it alerts operating personal. In some embodiments of the invention, if the software also determines that stick-slip is occurring, for example, using the methodology discussed below in section 7 concerning the identification of causes of lost drilling performance (e.g., high torsional vibration at a frequency less than 1×bit speed), it would automatically adjust the operating parameters as shown in FIG. 10 until the torque was reduced below the limit.

According to the current invention, as an alternative to the finite element method used by WellDrill™ discussed above, torque along the drill string can also be predicted using the finite difference methodology discussed above in the section entitled Stick-Slip Software, with the torque applied to each section being equal to the incremental moment $\Delta M = \mu F_n r$. Using that alternative, the software compares the predicted values for torque at the measured locations to the measured values and adjusts the model so that the predicted values at the measured locations agree with the measured values. Such adjustment can be accomplished by varying the sliding coefficient of friction, μ, used by the software.

6. Critical Speed Map

Figure 8:
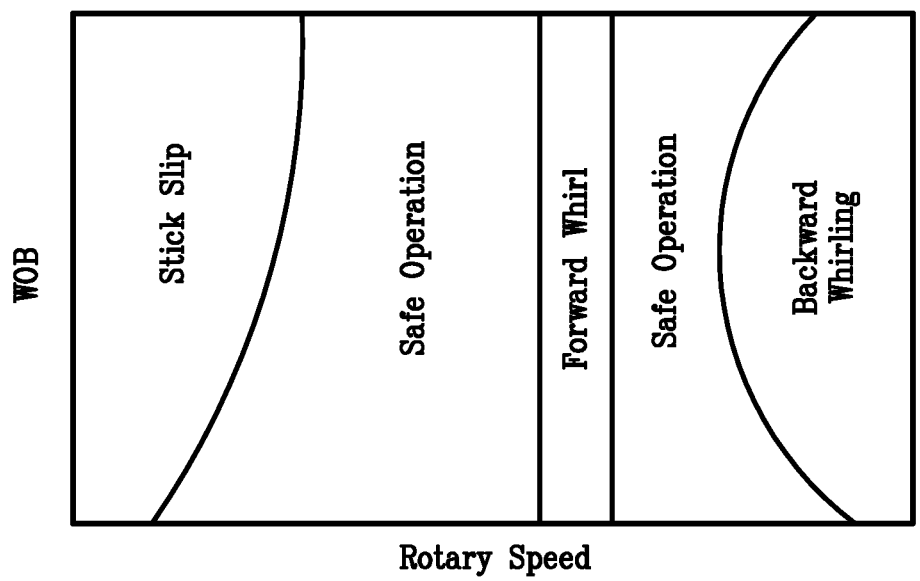
FIG. 8 is a hypothetical critical speed map created by the software of the current invention.

As discussed above, the software 20 creates a drill string model that allows it to predict the vibration level at each point along the drill string for every combination of WOB, drill string RPM, and mud motor RPM. Using the software discussed above in the section entitled "Stick-Slip Software", the software 20 also whether stick-slip will occur at every combination of WOB and drill string RPM Based on these predictions, the software displays critical speed maps, an example of which is shown in FIG. 8, indicating the combinations of WOB and drill string RPM that should be avoided to avoid high axial or lateral vibration or stick slip. Another critical speed map indicates the combinations of WOB and mud motor RPM that should be avoided. The critical speed maps are displayed to the operator, for example on the CRT screen 19, as a guide for setting drilling parameters.

7. Identifying Causes of Lost Performance

In a preferred embodiment, the software 20 according to the invention includes an expert system that identifies the causes of lost drilling performance and, in some embodiments, makes recommendations to the operator for mitigating the lost performance. In still other embodiments, the software automatically adjusts certain predetermined operating parameters to minimize such lost performance. Preferably, the software relies on a data base, which may be stored in memory device 21, that correlates a set of predetermined causes of lost drilling performance X with a set of predetermined symptoms of lost performance Y on the basis of probabilities—that is, the probably $P_{xy}$ that cause of lost drilling performance X will manifest itself in the presence of symptom Y. Such a data can be created, for example, based on experience with similar drilling operations or based on analysis of data from the subject drilling operation. Table I shows a correlation relating the probabilities $P_{xy}$ that causes of lost performance $X_1$ through $X_n$ will manifest themselves in the appearance of symptoms $Y_1$ through $Y_m$.

TABLE I

| Causes of lost | Symptoms of Lost Performance | | | | |
|---|---|---|---|---|---|
| performance | $Y_1$ | $Y_2$ | $Y_3$ | ... | $Y_m$ |
| $X_1$ | $P_{11}$ | $P_{12}$ | $P_{13}$ | ... | $P_{1m}$ |
| $X_1$ | $P_{21}$ | $P_{22}$ | $P_{23}$ | ... | $P_{2m}$ |
| ... | ... | ... | ... | ... | ... |
| $X_n$ | $P_{n1}$ | $P_{n2}$ | $P_{n3}$ | ... | $P_{nm}$ |

As an example, Table II is a correlation showing the probability $P_{xy}$ that a cause of lost performance X will manifest itself as symptom Y, where the causes of lost performance are vibration ($X_1$), problems with the drill bit ($X_2$), problems with the bottomhole assembly ("BHA") ($X_3$), and difficulties created by the formation ($X_4$), and the symptoms of lost performance are those which manifest themselves as vibration ($Y_1$), downhole dynamics ($Y_2$), operating conditions ($Y_3$), phenomenon measureable by rig floor and top drive sensors ($Y_4$), and matters concerning the well profile ($Y_5$).

TABLE II

| | Symptoms of Lost Performance, Y | | | | |
|---|---|---|---|---|---|
| Causes of lost performance, X | Vibration | Downhole Dynamics | Operating Conditions | Rig Floor & Top Drive Sensors | Well Profile |
| Vibration | $P_{11}$ | $P_{12}$ | $P_{13}$ | $P_{14}$ | $P_{15}$ |
| Drill Bit | $P_{21}$ | $P_{22}$ | $P_{23}$ | $P_{24}$ | $P_{25}$ |
| BHA | $P_{31}$ | $P_{32}$ | $P_{33}$ | $P_{34}$ | $P_{35}$ |
| Formation | $P_{41}$ | $P_{42}$ | $P_{43}$ | $P_{44}$ | $P_{45}$ |

Figure 9:
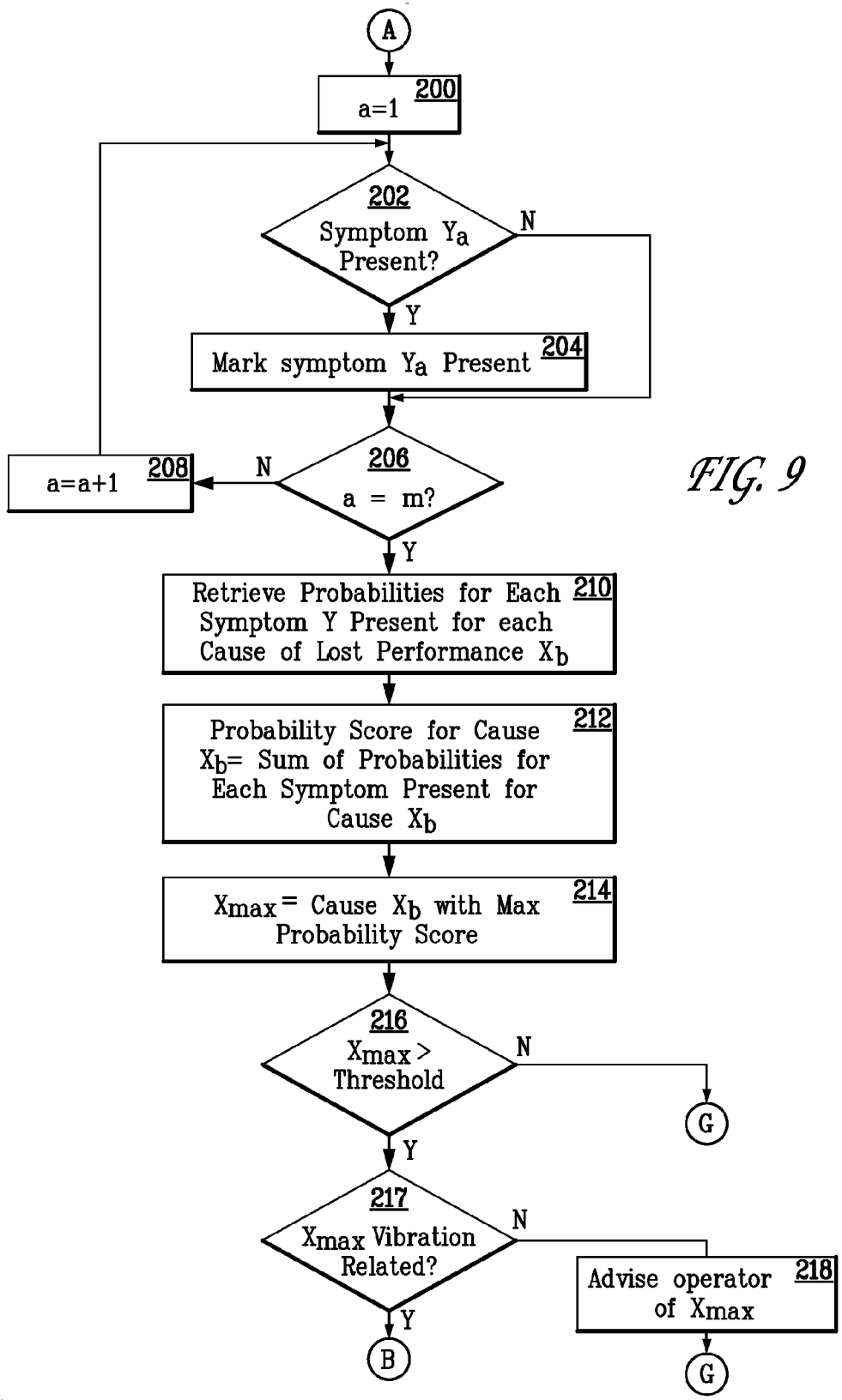
FIG. 9 is a flowchart of the method of identifying the cause of loss of drilling performance according to the current invention.

As shown in FIG. 9, during the drilling operation, the software determines the most likely cause of lost performance $X_{max}$ by analyzing the data generated by various sensors to determine which symptoms of lost performance $Y_a$ are present, and then summing the probabilities associated with those symptoms for each cause of lost performance $X_b$ to identify the cause of lost performance exhibiting the highest probability of being present. In steps 200-208, the software goes through each of a pre-determined list of symptoms of lost drilling performance $Y_a$ and compares the sensor data to criteria set for each symptom to determine whether the symptom is deemed to be present. For example, one symptom of lost drilling performance is fluctuating WOB, the presence of which correlates well with high axial vibration (bit bounce) and, to a lesser extent, stringers in the formation and stick-slip. The criteria for determining that such fluctuating WOB is present might be fluctuations of at least 50%. Accordingly, the software will analysis the data from the WOB sensor and determine whether the criteria for fluctuating WOB are satisfied—that is, whether the fluctuations exceed 50%—and, if so, it will flag fluctuating WOB as a symptom of lost drilling performance that is present in the data.

In step 210, the software goes through each of a pre-determined list of causes of lost drilling performance $X_b$ and, by querying the data base correlating probabilities that the specified causes of vibration will be manifested in the specified symptoms, retrieves the probability that each symptom found to be present is the result of such cause. For example, the data base may indicate that (i) whirl type vibration has a 10% probability of causing fluctuating WOB, (ii) bit bounce has a 100% probability of causing fluctuating WOB and (iii) stick-slip has a 50% probability of causing fluctuating WOB. If fluctuating WOB were deemed to be present, each of these probabilities would be retrieved.

In step 212, the probabilities associated with each symptom of lost drilling performance deemed to be present are summed for each potential cause of lost performance. For example, in addition to fluctuating WOB, another symptom of lost drilling performance might be a decrease in vibration as a result of an increase in WOB. If the sensor data indicates that this symptom is also present, and the data base indicates that bit bounce has a 30% probability of manifesting itself as a decrease in vibration as a result of an increase in WOB, then the 30% probability associated with a decrease in vibration resulting from an increase in WOB is added to the 100% probability associated with fluctuating WOB so that the accumulating probability of bit bounce becomes 130%. In step 214, the cause of lost drilling performance with the maximum total probability, $X_{max}$, is identified.

A simple version of a data base for three vibration-related causes of lost performance and thirteen symptoms of lost performance is shown in Table III.

TABLE III

| Causes of lost performance associated with vibration | Symptoms of Loss Performance | | | | | | | | | | | | |
|---|---|---|---|---|---|---|---|---|---|---|---|---|---|
| | Vibration | | | | | Operating Conditions | | | | | | | |
| | Amplitude | | Frequency | | Downhole | | Increase RPM | | Increase WOB | | Increase flowrate | | |
| | High lateral vibration | High axial vibration | (No. cones/ no. blades) × bit speed | Multiple of bit speed | Less than 1X rotary speed | Fluctuating WOB | High bending stress | Vib increases | Vib decreases | Vib increases | Vib decreases | Vib increases | Vib decreases |
| Backward Whirl | 80 | 0 | 70 | 30 | 0 | 10 | 40 | 80 | 0 | 50 | 0 | 0 | 0 |
| Bit Bounce | 0 | 60 | 80 | 20 | 0 | 100 | 0 | 20 | 0 | 0 | 30 | 0 | 0 |
| Stick-slip | 10 | 0 | 0 | 0 | 100 | 0 | 0 | 0 | 80 | 80 | 0 | 0 | 0 |

Table III shows the probabilities that each of three vibration-related causes of lost drilling performance—backward whirl, bit bounce and stick-slip—will manifest itself as each of thirteen symptoms of lost performance, grouped into three categories—vibration, downhole dynamics and operating conditions. For example, experience may show that there is an 80% probability that backward whirling will result in a very high (i.e., severe) amplitude of lateral vibration, a 70% probability that backward whirl will result in vibration having a frequency equal to the number of cones on the drill bit times the number of blades divided by the bit speed, etc. By contrast, experience may show that there is 0% probability that bit bounce will result in very high lateral vibration but a 60% probability that it would result in high axial vibration.

At each data gathering interval, the software will determine the presence of the various symptoms and then calculate which cause of lost performance is most likely occurring by adding up the probabilities. In the example shown in Table IV, analysis of the data from the vibration sensors indicates that high lateral vibration is present at a frequency that is equal to the number of cones on the drill bit divided by the number of blades on the drill bit multiplied by RPM of the drill bit. The vibration sensor data does not indicate that high axial vibration is present or that the frequency of the vibration is either a multiple of drill bit RPM or less than one times the drill string RPM. With respect to downhole dynamics, analysis of the WOB sensor indicates that the WOB is not fluctuating, whereas analysis of the data from strain gauges on the drill collar indicates that the bending stress on the drill bit is high. With respect to operating conditions, comparison with prior sets of data indicate that an increase in drill bit RPM resulted in an increase in vibration but that an increase in WOB resulted in decreased vibration and that an increase in mud flow rate resulted in no change in vibration. By retrieving and summing the probabilities associated with each of these symptoms, obtained from the data base stored in memory, the software determines that the most likely cause of lost performance is backward whirl, as shown by the "Total Score" in Table IV. Preferably, the software performs such an analysis each time a set of data are transmitted up hole via the mud pulse telemetry system, wired pipe or other transmission system, which may be as often as every few minutes.

TABLE IV

| Causes of lost performance associated with vibration | Vibration - Amplitude - High lateral vibration | Vibration - Amplitude - High axial vibration | Vibration - Frequency - Vib. freq = (no. cones/ no. blades × bit speed) | Vibration - Frequency - Multiple of bit speed | Vibration - Frequency - Less than 1X rotary speed | Downhole Dynamics - Fluctuating WOB | Downhole Dynamics - High bending stress | Operating Conditions - Increase RPM - Vib increases | Operating Conditions - Increase RPM - Vib decreases | Operating Conditions - Increase WOB - Vib increases | Operating Conditions - Increase WOB - Vib decreases | Operating Conditions - Increase flowrate - Vib increases | Operating Conditions - Increase flowrate - Vib decreases | Total score |
|---|---|---|---|---|---|---|---|---|---|---|---|---|---|---|
| Condition Present? | X | X | | | | X | X | | | X | | | | |
| Backward Whirl | 80 | | 70 | | | | 40 | 80 | | 0 | | | | 270 |
| Bit Bounce | 0 | 80 | | | | 0 | | 20 | | 30 | | | | 130 |
| Stick-slip | 10 | 0 | | | | 0 | | 0 | | 0 | | | | 10 |

Table V shows a more extensive listing of the causes of lost performance preferably used in the software.

TABLE V

Causes of Lost Performance

| Vibration | Drill Bit | BHA | Formation |
|---|---|---|---|
| Bit backward whirl | Worn bit | Buckling | Stringers |
| BHA forward whirl | Damaged bit | Stabilizer balling | Hole collapse |
| BHA backward whirl | Hole cleaning | Cracked collar | Differential sticking |
| Bit bounce | Plugged bit | Wash out | Ledges |
| Mud motor vibration | Junk in hole | Undergauge stabilizer | Enlarged hole |
| Stick-slip | Bit balling | Insufficient hole cleaning | |
| BRA imbalance/bent collar | | Collar/bore hole contact | |
| | | Agitator | |
| | | Jars fired | |
| | | Motor stator damage | |
| | | Motor bearing damage | |
| | | Mud motor wear | |

Tables VI, VII and VIII show more extensive listings of the symptoms of lost performance. The symptoms involving "MSE" in Table VIII refer to the "Mechanical Specific Energy" calculated as discussed in section 11, below, concerning optimization of drilling efficiency.

TABLE VI

Vibration-Related Symptoms of Lost Performance

| Amplitude | Frequency |
|---|---|
| Severe/high lateral vibration | Less than 1X bit speed |
| Severe/high axial vibration | 1X bit speed |

TABLE VI-continued

Vibration-Related Symptoms of Lost Performance

| Amplitude | Frequency |
|---|---|
| Severe/high torsional vibration | (No. cones/blades) x bit speed |
| | Multiple of bit speed |
| | Less 1X drill string speed |
| | 1X drill string speed |
| | Multiple of drill string speed |
| | No. lobes of mud motor x motor speed |

TABLE VII

| Downhole Dynamics Related Symptoms | Operating Conditions Related Symptoms - Increasing RPM causes | Increasing WOB causes | Increasing mud flow rate causes |
|---|---|---|---|
| Low WOB | Increased vibration | Increased vibration | Increased vibration |
| High WOB | Decreased vibration | Decreased vibration | Decreased vibration |
| Fluctuating WOB | Unchanged vibration | Unchanged vibration | Unchanged vibration |
| Low torque | Vibration peak | Vibration peak | Vibration peak |
| High torque | Sudden increase | Sudden increase | Sudden increase |
| Fluctuating torque | Sudden decrease | Sudden decrease | Sudden decrease |
| Low bending stress | | | |
| High bending stress | | | |
| Fluctuating bending | | | |

TABLE VIII

| Symptoms from Rig Floor/Top Drive Sensors | Well Profile Related Symptoms |
|---|---|
| ROP decline | High build rate |
| ROP increase | Straight hole |
| ROP unchanged | Tortuosity |
| MSE increase | Vertical hole |
| MSE decrease | Horizontal hole |
| MSE unchanged | Poor directional control |
| RPM fluctuations | |
| WOB fluctuations | |
| Torque fluctuations | |
| Torque decrease | |
| Torque fluctuations | |
| Pressure increase | |
| Pressure decrease | |
| Pressure fluctuations | |

As an example, Table IX and X set forth one data set that may be used to specify the percent probability that each identified symptom (listed in the rows) is the result of the associated cause of lost performance (listed in the column headings), for the symptoms of lost performance identified in Tables VI, VII and VIII.

TABLE IX

Causes of Lost Drilling Performance

| | Symptoms of Lost Drilling Performance | Buckling | Stabilizer balling | Cracked collar | Wash Out | Undergauge stabilizer | Insufficient hole cleaning | Collar/hole contact | Agitator | Jars fired | Motor stator | Motor bearing | Stringers | Hole collapse | Differential sticking | Ledges |
|---|---|---|---|---|---|---|---|---|---|---|---|---|---|---|---|---|
| Vib Level | Severe/critical lateral vib | 30 | 25 | 50 | 50 | 30 | | 30 | | | | 30 | 10 | 30 | | |
| | Severe/critical axial vib | | | | 30 | | | | 40 | 60 | | 10 | 30 | | | 30 |
| | Severe/critical torsional vib | 20 | 10 | | | | | | | | | 10 | 30 | 40 | 50 | |
| | High lateral vib | 75 | 40 | 70 | 70 | 75 | | 60 | | | | 60 | 30 | 70 | | |
| | High axial vib | | | | | | | | 80 | 100 | | 30 | 70 | | | 80 |
| | High torsional vib | 40 | 30 | | | | | | | | | 30 | 70 | 80 | 90 | |
| Vib Frequency | Less then 1x bit speed | | | | | | | | | | | | | 80 | 80 | |
| | 1x bit speed | 50 | | 40 | 40 | | | | | | | | | | | |
| | # cones/blades × bit speed | | | | | | | | | | | | 80 | | | 70 |
| | Multiple of bit speed | | | | | | | | | | | | 20 | | | 30 |
| | Less than 1x rotary speed | | | | | | | | | | | | | | | |
| | 1x rotary speed | | | | | | | | | | | | | | | |
| | Multiple of rotary speed | | | | | | 60 | 60 | | | | | | | | |
| | # lobes × motor speed | | | | | | | | | | | | | | | |
| WOB/TOB/BOB | Low WOB | | | | | | | | | | | | | | | 50 |
| | High WOB | | | | | | | | | | | | 70 | | | |
| | Flucuating WOB | | | | | | | | | | | | | | | |
| | Low torque | | | | | | | | | | | | | | | |
| | High torque | | | | | 50 | 50 | | | | | | 70 | 100 | 100 | 50 |
| | Fluctuating torque | | | | | | | | | | | | | | | |
| | Low bending | | | | | | | | | | | | | | | |
| | High bending | 60 | | 80 | | | | 30 | | | | | | | | |
| | Fluctuating bending | | | | | | 70 | 70 | | | | | | | | |
| Increasing RPM | Vib stays same | | | | | | | | | | | | | | | |
| | Vib increases | 50 | 40 | 30 | | 40 | | 30 | | | | | 50 | | | 30 |
| | Vib decreases | | | | | | 50 | | | | | | | 50 | 50 | 30 |
| | Vib peaks | | | 70 | | | | | | | | | | | | |

TABLE IX-continued

| Symptoms of Lost Drilling Performance | | Buck-ling | Stabi-lizer ball-ing | Crack-ed collar | Wash Out | Under-gauge stabi-lizer | Insuf-ficient hole cleaning | Col-lar/ hole contact | Agi-tator | Jars fired | Mo-tor stator | Mo-tor bear-ing | String-ers | Hole col-lapse | Differ-ential sticking | Ledges |
|---|---|---|---|---|---|---|---|---|---|---|---|---|---|---|---|---|
| In-creasing WOB | Comes on suddenly | | 30 | | | 60 | | 30 | | | | | | | | |
| | Drops out suddenly | | 30 | | | | | | | | | | | | | |
| | Vib stays same | | | | | | 70 | | | | | | 100 | | | |
| | Vib increases | 30 | | | | | | | | | 40 | 50 | 60 | | | 30 |
| | Vib decreases | | | | | 40 | | | | | | | 30 | | | 70 |
| | Vib peaks | | | | | | | | | | | | | | | |
| In-creasing Flow Rate | Comes on suddenly | 70 | | | | | | | | | | | | | | |
| | Drops out suddenly | | | | | 60 | | | | | | | | | | |
| | Vib stays same | 100 | | | | | | | | | | | | | | |
| | Vib stays same | | | | | | | | | | | | | | | |
| | Vib increases | | 50 | | | | 75 | | | | | | | 20 | 30 | |
| | Vib decreases | | | | | | | | | | | | | | | |
| | Vib peaks | | | | | | | | | | | | | | | |
| Rig Floor/ Top Drive Sensors | Comes on suddenly | | 20 | | | | | | | | | | | | | |
| | Drops out suddenly | | | | | | | | | | | | | | | |
| | ROP decline | 75 | | | | 30 | 60 | 20 | | | 50 | 30 | 70 | 100 | 100 | 80 |
| | ROP increase | | | | | | | | 50 | | | | | | | |
| | ROP unchanged | | | | | | | | | | | | 30 | | | |
| | MSE increase | | | | | | | 80 | | | | | | | | |
| | MSE decrease | 75 | | | | 20 | 60 | 20 | | | 50 | | 70 | 100 | 100 | 80 |
| | MSE unchanged | | | 90 | | | | | | | | | 30 | | | |
| | RPM fluctuations | | | | | | | | | | | | 50 | | | |
| | WOB fluctuations | | | | | | | | | | | | | | | 60 |
| | Torque increases | 60 | | | | 20 | 60 | 10 | | | 30 | 30 | | 100 | 100 | |
| | Torque decreases | | | | | | | | | 80 | | | | | | 40 |
| | Torque fluctuations | | | | | | | | | | | | 50 | | 40 | |
| | Pressure increase | | 60 | | | | 60 | | | | | | 60 | 80 | | |
| | Pressure decrease | | | 70 | 100 | | | | | | 40 | | | | | |
| | Pressure fluctuations | | | | | | 20 | 50 | | | | | | | | |
| Well Pro-file | High build rate | | 80 | | | | | 50 | | | | | | | | |
| | Straight hole | | | | | | | | | | | | | | | |
| | Tortuonsity | | 10 | | | | | | | | | | | | | |
| | Vertical hole | | | | | | | | | | | | | | | |
| | Horizontal hole | | | | | | 40 | 80 | 80 | | | | | | | |
| | Poor directional control | | 10 | 30 | | | | | | | | | 40 | | 40 | |

TABLE X

| Symptoms of Lost Drilling Performance | | Causes of Lost Drilling Performance | | | | | | | | | | | | |
|---|---|---|---|---|---|---|---|---|---|---|---|---|---|---|
| | | Bit Backward whirl | BHA forward whirl | BHA backward whirl | Bit bounce | Motor vibration | Stick-slip | BHA imbal/bend collar | Worn bit | Damaged bit | Hole cleaning | Plugged bit | Junk in hole | Bit balling |
| Vib Level | Severe/critical lateral vib | 80 | 30 | 80 | | 50 | 20 | 20 | 20 | 40 | | | 30 | |
| | Severe/critical axial vib | | | | 30 | | 20 | | 20 | 40 | | | 30 | |
| | Severe/critical torsional vib | | | | | | 50 | | | 40 | | | | |
| | High lateral vib | 100 | 60 | 100 | | 70 | 30 | 40 | 30 | 60 | | | 50 | |
| | High axial vib | | | | 60 | | 30 | | 30 | 60 | | | 60 | |
| | High torsional vib | | | | | | 100 | | | 60 | | | | |
| Vib Frequency | Less then 1x bit speed | | | | | | 100 | | | | | | | |
| | 1x bit speed | | | | | | | | | | | | | |
| | # cones/blades × bit speed | 70 | | | 80 | | | | | | | | | |
| | Multiple of bit speed | 30 | | | 20 | | | | | 50 | | | 50 | |
| | Less than 1x rotary speed | | | | | | 100 | | | | | | 50 | |
| | 1x rotary speed | | 50 | | | | | 100 | | | | | | |
| | Multiple of rotary speed | | 50 | 100 | | | | | | | | | | |
| | # lobes × motor speed | | | | | 100 | | | | | | | | |
| WOB/TOB/BOB | Low WOB | | | | 20 | | | | | | | | | |
| | High WOB | | | | 60 | | | | | | | | | |
| | Fluctuating WOB | 10 | | 10 | 100 | | 50 | | | | | | 40 | |
| | Low torque | | | | | | | | 60 | | | | | 30 |
| | High torque | 40 | 20 | 50 | 50 | | 70 | | 60 | 30 | 30 | 30 | | |
| | Fluctuating torque | | | | 100 | | 100 | | | 40 | 40 | 40 | | |
| | Low bending | | | | | | | | | | | | | |
| | High bending | 40 | 60 | 50 | | 60 | | 50 | | | | | | |
| | Flucuating bending | 100 | 50 | 100 | | 100 | | 20 | | | | | | |
| Increasing RPM | Vib stays same | | | | | | | | 50 | 40 | 40 | 40 | 40 | 60 |
| | Vib increases | 80 | | 80 | 20 | 30 | | 100 | | 50 | | | 40 | 40 |
| | Vib decreases | | | | | | 80 | | | | | | | |
| | Vib peaks | | 100 | | 80 | 100 | | | | | | | | |
| | Comes on suddenly | 40 | | 40 | | | | | | 50 | | | | |
| | Drops out suddenly | | | | | | 20 | | | | 50 | | 50 | |
| Increasing WOB | Vib stays same | 20 | | | | | | | 30 | | | 40 | 50 | 60 |
| | Vib increases | 50 | 50 | | | | 80 | 100 | | 50 | 30 | | | 25 |
| | Vib decreases | | | 70 | 30 | | | | | | | | | 25 |
| | Vib peaks | | | | | | | | | | | | | |
| | Comes on suddenly | | | | | 70 | | 40 | | 50 | 50 | | | |
| | Drops out suddenly | 25 | 25 | 40 | | | | | | | | | | |
| Increasing Flow Rate | Vib stays same | | | | | | 80 | 80 | | | | | | |
| | Vib stays same | | | | | 30 | | | | | | | | |
| | Vib increases | | | | | | | | | | 80 | 30 | | 50 |

TABLE X-continued

| | | Causes of Lost Drilling Performance | | | | | | | | | | | | |
|---|---|---|---|---|---|---|---|---|---|---|---|---|---|---|
| | Symptoms of Lost Drilling Performance | Bit Backward whirl | BHA forward whirl | BHA backward whirl | Bit bounce | Motor vibration | Stick-slip | BHA imbal/bend collar | Worn bit | Damaged bit | Hole cleaning | Plugged bit | Junk in hole | Bit balling |
| Rig Floor/ Top Drive Sensors | Vib decreases | | | | | 70 | | | | | | | | |
| | Vib peaks | | | | | | | | | | | | | |
| | Comes on suddenly | | | | | | | | | | | | | |
| | Drops out suddenly | | | | | | | | | | | | | |
| | ROP decline | 75 | 20 | 75 | 20 | 40 | 75 | 20 | 100 | 100 | 75 | 75 | 95 | 80 |
| | ROP increase | | | | | 50 | | | | | | | | |
| | ROP unchanged | 25 | 40 | 20 | | | 20 | | | | | | | |
| | MSE increase | | | | | 60 | | | | | | | | |
| | MSE decrease | 75 | 30 | 75 | 20 | 40 | 90 | | 100 | 100 | 60 | 60 | 95 | 80 |
| | MSE unchanged | | | | | | | | | | | | | |
| | RPM fluctations | | | | 30 | | 100 | | | 40 | 30 | | | |
| | WOB fluctations | | | | 70 | | | | | 30 | | | | |
| | Torque increases | 30 | 20 | 30 | | | 100 | | | 60 | 50 | 20 | 50 | |
| | Torque decreases | | | | | | | | 80 | | | | 50 | 70 |
| | Torque fluctuations | | | | 50 | | 100 | | | 30 | | | | |
| | Pressure increase | | | | | | | | | | 30 | 100 | | 40 |
| | Pressure decrease | | | | | | | | | | | | | |
| | Pressure fluctuations | | | | | | | | | | 40 | | | |
| Well Profile | High build rate | | | | | | 30 | | | | | | | |
| | Straight hole | 30 | 40 | 40 | 20 | | | | | | | | | |
| | Tortuonsity | | | | | 30 | | | | | | | | |
| | Vertical hole | 30 | 30 | 30 | | | | | | | | | | |
| | Horizontal hole | | | | | | 50 | | | | | | | |
| | Poor directional control | 50 | 20 | 30 | | 20 | 60 | 30 | | | | | 40 | 40 |

8. Eliminating the Cause of Lost Drilling Performance

In step 216, the software determines whether the maximum Total Score, $X_{max}$, exceeds a predetermined threshold. If it does not, the software determines that no action need be taken to eliminate the identified cause of lost drilling performance. If, in step 216, the software determines that the Total Score exceeds the predetermined threshold, the results of the foregoing analysis—that is, the most likely cause of lost drilling performance—is displayed to the operator in step 218 so that he can take remedial action. For example, if the analysis indicated that the most likely cause of lost performance was a worn drill bit, the operator could schedule a replacement of the drill bit.

In a preferred embodiment of the invention, the software 20 provides recommendations to the drill rig operator for eliminating the cause of lost drilling performance. For example, if the most likely cause of lost performance was identified as a worn bit, the software will advise the operator to decrease drill bit RPM or WOB in order to reduce the wear on the bit. Similarly, if the cause of lost performance were insufficient hole cleaning, the software would advise the operator to increase the flow rate of drilling mud and reduce the WOB. Prior to providing a recommendation to the operator to adjust a drilling parameter, the software determines whether such adjustment would result in high vibration by predicting the vibration that would result from such operation as discussed in section 4 or result in a stick-slip situation by performing the stick-slip analysis discussed in section 3 concerning the creation of critical speed maps.

In step 217, the software determines whether or not the most likely cause of lost performance is vibration related. If the most likely cause of lost drilling performance is vibration-related, the software advises the operator as to how to mitigate such lost performance, as discussed below.

Figure 11:
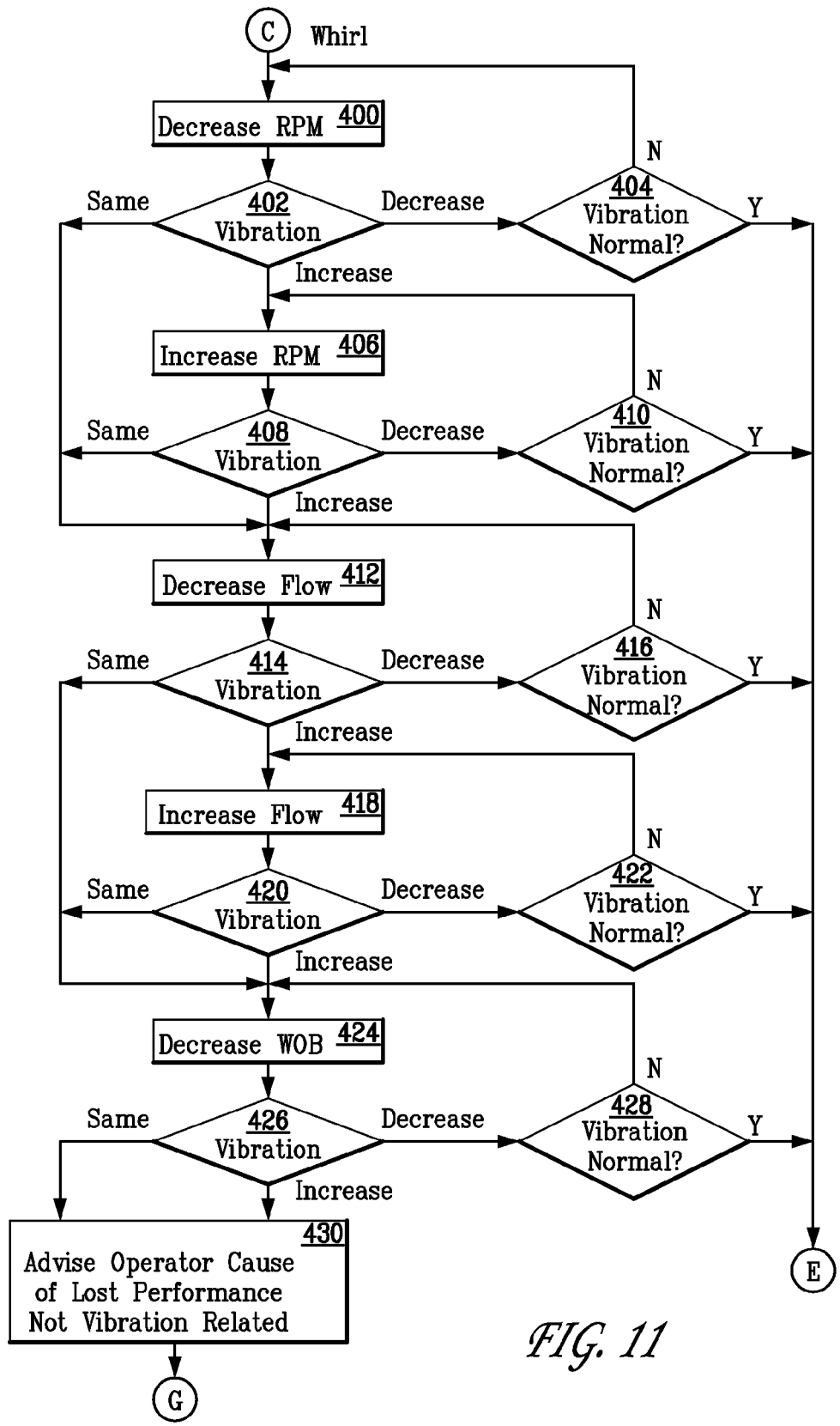
Figure 12:
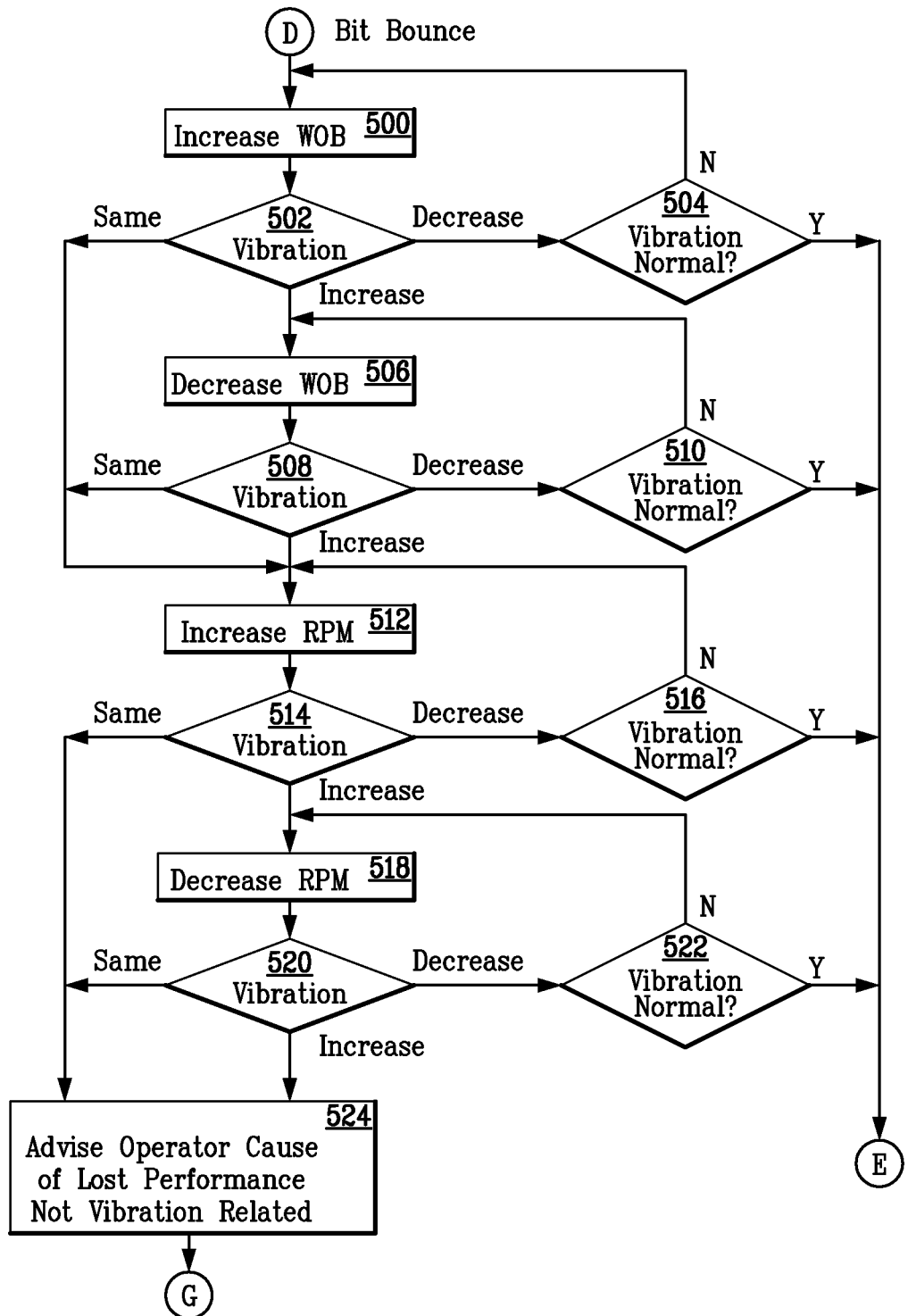

FIGS. 10-12 show one embodiment of a method for mitigating lost drilling performance. In step 300, a determination is made as to the type of vibration associated with the identified vibration-related cause of lost drilling performance— for example, bit bounce, whirl or stick-slip. If the software determined that the high vibration is due to stick-slip, steps 302-306 are performed, in which the software advises the operator to increase drill bit RPM by a predetermined amount and then determines whether such an increase in drill bit RPM reduces vibration below a predetermined maximum level associated with "normal" vibration. If the increase in drill bit RPM caused the vibration to decrease but it was still above normal, the software would recommend another such decrease in RPM to the operator as indicated in step 306. If the vibration was not so reduced, steps 308-312 are performed, in which the software advises the operator to decrease WOB by a predetermined amount and then determines if such a decrease in WOB reduces vibration below the predetermined maximum. If either procedure reduces vibration below the predetermined maximum, the cause of lost drilling performance is deemed to have been mitigated. If software determines that neither procedure is successful, the operator is advised in step 314 that lost performance is not vibration related so that the operator can investigate other potential sources of lost drilling performance.

If the cause of lost performance is whirl, steps 400-410, shown in FIG. 11, are performed, in which the software advises the operator to decrease and then increase drill bit RPM and determines if such changes mitigates the whirl. If not, steps 412-422 are performed, in which the software recommends to the operator to increase and then decrease the flow rate of drilling mud and determines if such changes mitigate the whirl. If it does not, steps 424-428 are performed, in which the software recommends to the operator to decrease WOB and determines if such change mitigates the whirl. If the software determines none of these recommendations are successful, the operator is advised in step 430 that lost performance is not vibration related so that the operator can investigate other potential sources of lost drilling performance.

If the cause of lost performance is bit bounce, steps 500-510, shown in FIG. 12, are performed, in which the software recommends to the operator to increase and then decrease WOB and determines if such changes mitigate the bit bounce. If it does not, then steps 512-522 are performed, in which the software recommends to the operator to increase and then decrease drill bit RPM and determines if such change mitigates the bit bounce. If the software determines that none of these procedures are successful, the operator is advised in step 524 that lost performance is not vibration related so that the operator can investigate other potential sources of lost drilling performance.

As previously discussed in connection with the creation of a critical speed map, the software 20 predicts the drill bit RPM, WOB and mud motor RPM that will result in excessive vibration due to resonance or stick-slip. Although not illustrated in the flow charts shown in FIGS. 10-12, prior to recommending any change in drill bit RPM, WOB, or drilling mud flow rate, the software will predict whether the anticipated change will increase vibration, and especially whether it would result in operation at a critical speed. If the prediction indicated that the anticipated change would drive operation into an area of high vibration, the software would not recommend that change and the next vibration-related mitigation procedure would be recommended instead.

In the foregoing, the predetermined increments by which the amounts the drill bit RPM, WOB and drilling mud flow rate are increased or reduced may be about 5% for each increase/decrease, although greater or lesser amounts could also be used. The preferred embodiment of the method of mitigating vibration-related lost drilling performance discussed above relies on procedures believed by the inventors to most likely mitigate vibration so as to avoid unnecessary changes in operating parameters. For example, decreasing drill bit RPM or increasing WOB are not believed to be fruitful in attempting to mitigate stick-slip and, therefore, such changes are not effected in the methodology illustrated in FIG. 10. However, other changes in operating parameters could be incorporated into the method to mitigate vibration if experience showed them to be fruitful.

In some embodiments, instead of merely recommending changes that the operator makes to the operating parameters, the method described in the flowcharts shown in FIGS. 10-12 could be implemented by the software automatically changing the operating parameters. For example, to increase the drill bit RPM, the software would cause the processor to send a signal to the motor controller of the motor operating the top drive causing it to increase the motor speed of the top drive and, therefore, the RPM of the drill string. To increase the mud flow rate, the software would cause the processor to send a signal to the controller of the motor operating the mud pump causing it to increase the motor speed and, therefore, the mud flow. Similarly, to reduce the WOB, the software would cause the processor to send a signal to the motor controller of the motor that controls the draw works cables causing them to decrease the WOB.

9. Correcting the Model to Reflect Measured Vibration Levels

As discussed above, the software 20 has access to (i) the measured axial, lateral and torsional vibration at the locations of the accelerometers, supplied by the Vibration Memory Module™, (ii) the resonant frequencies for the axial, lateral and torsional vibration predicted by the WellDrill™ software, (iii) the mode shapes for the axial, lateral and torsional vibration based on real-time operating parameters predicted by the WellDrill™ software, and (iv) the levels of axial, lateral and torsional vibration at each point along the entire length of the drill string predicted by the WellDrill™ software. According to the invention, each time a set of data is received from the downhole sensors, the software 20 compares the measured level of vibration at the accelerometer locations to the predicted level of vibration at these same locations. If the software 20 determines that the difference between the predicted and measured vibration for any of the axial, lateral or torsional vibrations at accelerometer locations exceeds a predetermined threshold, it revises the model by varying the operating parameter inputs used in the model, according to a predetermined hierarchy, until the difference is reduced below the threshold.

Figure 13:
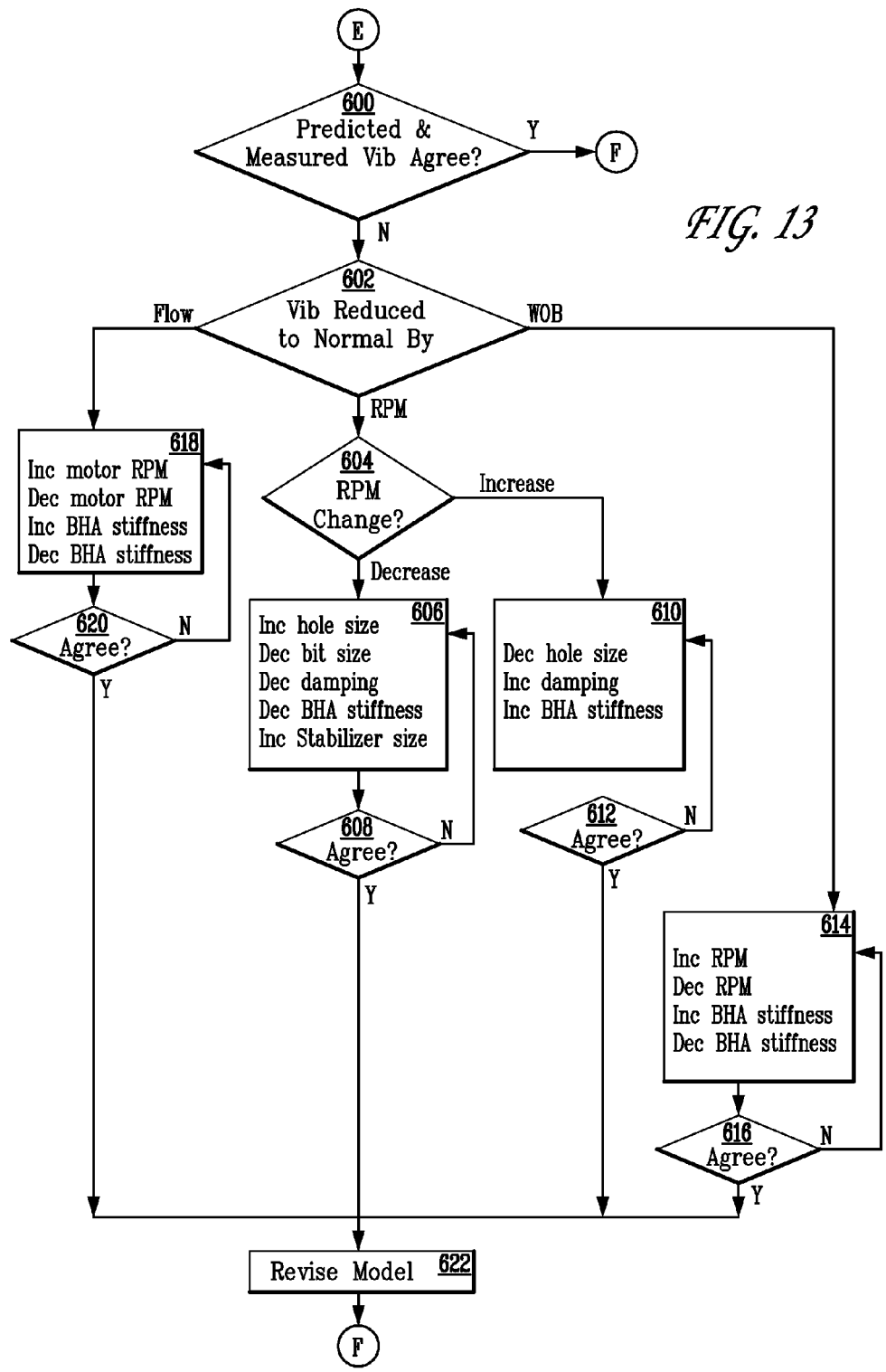
FIG. 13 is a flowchart of the method for revising the drill string model to reduce deviations between predicted and measured vibration, following mitigation of lost drilling performance due to vibration, according to the current invention.

Preferably, if the checking of predicted versus measured vibration is performed by the software following a successful mitigation of high vibration, discussed above, the results of the mitigation are used to guide the revision of the model used to predict the vibration, as shown in FIG. 13. In step 600, the amplitude of the measured vibration that precipitated the mitigation is compared to the amplitude of vibration predicted by the WellDrill™ model created as discussed above. If the difference exceeds a predetermined threshold, for example 10%, the model is revised to provide better agreement. Whether the vibration mitigation was accomplished by a change in drill mud flow rate, WOB or drill bit RPM is determined in step 602.

If mitigation was accomplished by changing drill bit RPM, steps 604-612 are performed. If mitigation was accomplished by decreasing drill bit RPM, then revisions to the model are made as specified in steps 606-608 to determine whether any result in a revised prediction of vibration that does not deviate from the measured value by more than the threshold amount.

Thus, the model is first revised by increasing the size of the bore hole used in the model by a predetermined amount. Although not indicated in the flow chart, if an increase in the borehole size by the predetermined about results in a reduction in the deviation between the measured and predicted vibration but does not reduce the deviation below the threshold, repeated incremental increases in bore hold size are attempted until the deviation drops below the threshold or the total increase in borehole size used in the model reaches a predetermined limit. If increases in borehole size up to the predetermined limit do not result in a reduction in the deviation below the threshold, then the software moves on to the next parameter in the hierarchy, in this case, the size of the drill bit used in the model. As indicated in step 606, the size of the drill bit used in the model is reduced in a manner similar to that discussed above in connection with the increase in hole size. If that does not result in agreement then, in succession, a decrease in the damping coefficient, a decrease in the drill string stiffness (i.e., the modulus of elasticity), and an increase in stabilizer size are attempted in a similar manner. If a change in one of these parameters reduces the deviation between measured and predicted vibration below the threshold, the model is revised in step 622 and the revised model used thereafter. If none of these successfully reduce the deviation between measured and predicted vibration, then, although not indicated in the flow chart, the model would be revised in step 622 to incorporate the value of the parameter that effected the biggest reduction in the deviation. As similar approach is followed in connection with the other attempts to revise the model that are illustrated in FIG. 13, discussed below.

Similar to the procedure discussed above, if mitigation was accomplished by increasing drill bit RPM, then revisions to the model are made as specified in steps 610-612 to determine whether any result in a revised prediction of vibration that does not deviate from the measured value by more than the threshold amount. Thus, the model is first revised by decreasing the size of the bore hole, followed by, in succession, increasing the damping coefficient, and increasing the stiffness of the drill string to determine whether any of these revisions reduce the deviation between the measured and predicted vibration below the threshold amount.

Similar to the procedure discussed above, if mitigation was accomplished by changing WOB, then revisions to the model are made as specified in steps 614-616 to determine whether any result in a revised prediction of vibration that does not deviate from the measured value by more than the threshold amount. Thus, the model is first revised by increasing WOB, followed by, in succession, decreasing WOB, increasing drill string stiffness and decreasing drill string stiffness to determine whether any of these revisions reduce the deviation between the measured and predicted vibration below the threshold amount.

Similarly to the procedure discussed above, if mitigation was accomplished by changing drilling mud flow rate, then revisions to the model are made as specified in steps 618-620 to determine whether any result in a revised prediction of vibration that does not deviate from the measured value by more than the threshold amount. Thus, the model is first revised by increasing mud motor RPM, followed by, in succession, decreasing mud motor RPM, increasing drill string stiffness and decreasing drill string stiffness to determine whether any of these revisions reduce the deviation between the measured and predicted vibration below the threshold amount.

Preferably, when using the methodology discussed above, the model is revised only if the changed parameter causes the deviation in the vibration at issue (e.g., the axial vibration at a particular accelerometer location) to drop below the threshold amount, without causing the deviation in another vibration (e.g., another mode of vibration or vibration in the same mode at another location) to exceed the threshold amount.

Figure 14:
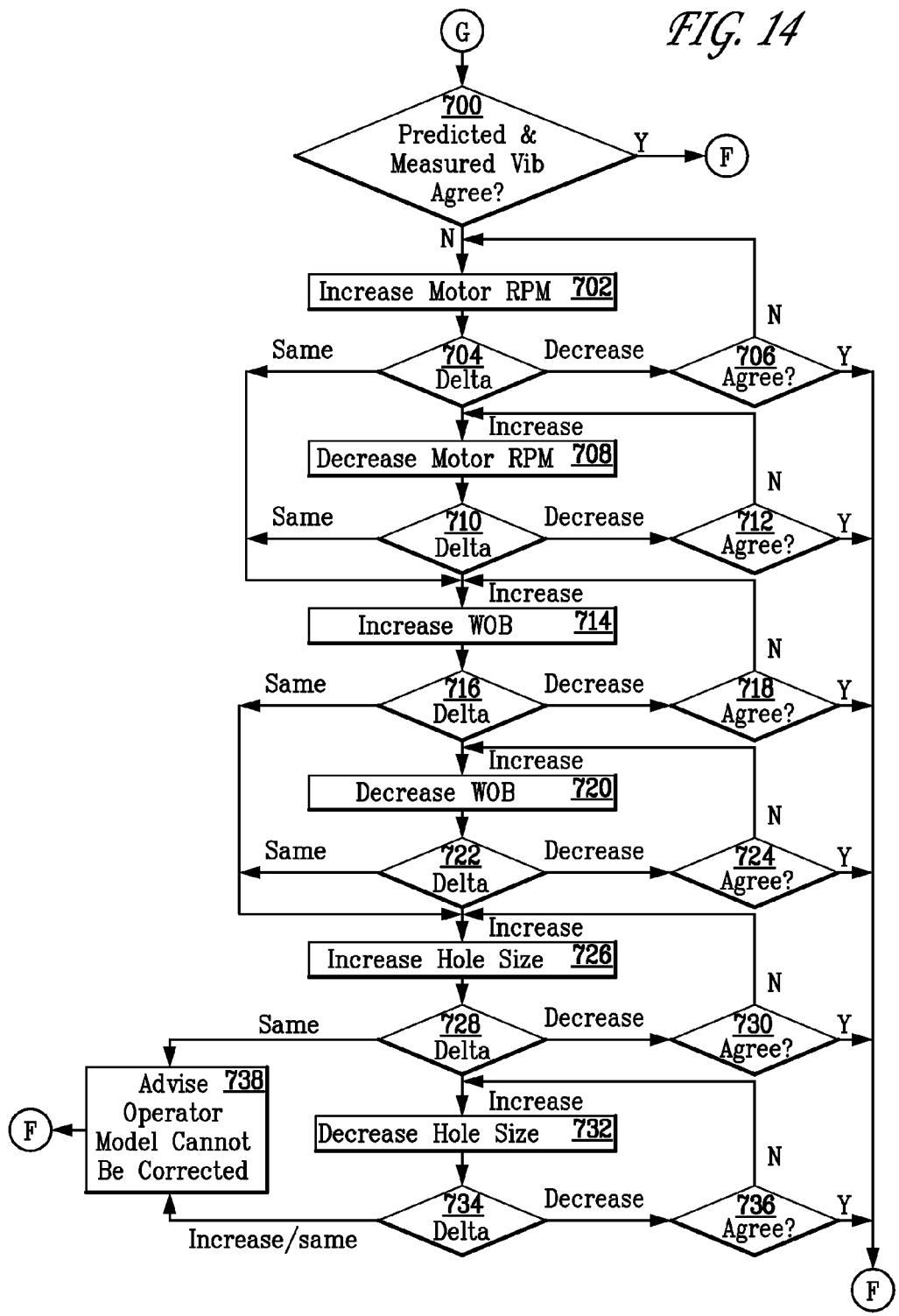
FIG. 14 is a flowchart of the method for revising the model to reduce deviations between predicted and measured vibration when mitigation of a loss of drilling performance due to vibration has not been attempted, according to the current invention.

The methodology discussed above, in which the successful mitigation of lost performance due to high vibration is used to guide the revision of the model to reduce deviations between measured and predicted vibration, cannot be employed if the attempted mitigation was unsuccessful or if mitigation was unnecessary. Accordingly, an alternative method is employed under such circumstances, as shown in FIG. 14. In the alternative method, the hierarchy in parameters for which changes are attempted is preferably mud motor RPM, followed by WOB, followed by borehole size.

It is determined in step 700 whether the deviation between the measured and predicted vibration exceeds the predetermined threshold amount. If so, in steps 702-712, incremental increases and decreases in the mud motor RPM used in the model, within a prescribed permissible range of variation, are attempted until the deviation drops below the threshold amount. If no value of the mud motor RPM within the permissible range of variation results in the deviation in the vibration at issue dropping below the threshold amount, the software revises the mud motor RPM used in the model to the value that reduced the deviation the most, but that did not cause the deviation between the predicted and measured values for another vibration to exceed the threshold amount.

If variation in mud motor RPM does not reduce the deviation below the threshold amount, in steps 714-724 the WOB used in the model is then decreased and increased, within a prescribed permissible range of variation, until the deviation drops below the threshold amount. If no value of WOB within the permissible range of variation results in the deviation between the measured and predicted vibration dropping below the threshold amount, the software revises the WOB used in the model to the value that reduced the deviation the most, but that did not cause the deviation between the predicted and measured values for another vibration to exceed the threshold amount.

If variation in WOB does not reduce the deviation below the threshold amount, in steps 726-736 the assumed borehole size used in the model is then decreased and increased within a prescribed permissible range of variation—which range may take into account whether severe washout conditions were expected, in which case the diameter could be double the predicted size—until deviation drops below the threshold amount. If a value of borehole size results in the deviation dropping below the threshold amount, without causing the deviation in another vibration to exceed the threshold amount, then the model is revised to reflect the new borehole size value. If no value of borehole size within the permissible range of variation results in the deviation between the measured and predicted vibration dropping below the threshold amount, the software revises the borehole size used in the model to the value that reduced the deviation the most, but that did not cause the deviation in another vibration level to exceed the threshold amount.

Alternatively, rather than using the sequential single variable approach discussed above, the software could be programmed to perform multi-variable minimization using, for example, a Taguichi method.

If none of the variations in mud motor RPM, WOB and bore hole diameter, separately or in combination, reduces the deviation below the threshold, further investigation would be required to determine whether one or more of the inputs were invalid, or whether there was a problem down hole, such as a worn bit, junk (such as bit inserts) in the hole, or a chunked out motor (rubber breaking down).

10. Life Prediction Based on Vibration & Temperature Monitoring

The life of the electronics components is heavily influenced by the time spent at elevated temperatures, as well as the exposure to shock and vibration. The higher the temperature, shock, vibration the greater the life consumed.

According to the invention, the software 20 calculates the remaining useful life in components of the bottomhole assembly 6 based on the vibration levels at the location of these components determined by the software during the drilling operation. In particular, the remaining life in bottomhole assembly components is calculated based on (i) the history of measured vibration, (ii) test results of the life these components at various levels of vibration, and (iii) the temperature to which the components have been subjected.

According to the Palmgren-Minor theory, cumulative damage due to strain reversals at various amplitudes on fatigue life can be expressed by the equation:

$$\frac{n_1}{N_1} + \frac{n_2}{N_2} + \ldots + \frac{n_i}{N_i} = C$$

where:
n=the number of cycles at which a given stress is applied to the component.
N=is the fatigue life corresponding to that stress.
C=a constant determined by experiment.

Therefore, the software uses the following equation, preferably based on testing at three strain levels—normal, high and severe, to determine the impact of vibration on fatigue life:

$$L=(t/T)_{normal}+(t/T)_{high}+(t/T)_{severe}$$

Where:
t=actual time at each given vibration level—i.e., normal, high and severe.
T=time to failure at each given vibration level based on fatigue testing the component to failure at each of normal, high and severe levels of vibration.
L=portion of fatigue life used up thus far.

For example, if testing indicated that the life of a component of the bottomhole assembly 6 is 1000 hrs at normal vibration, 100 hrs at a high vibration and 10 hours at severe vibration, and the component has been subjected to 500 hrs at normal vibration, 10 hrs at high vibration and 1 hour at severe vibration, the portion of its life that has been used up is $(500/1000)+(10/100)+(1/10)=0.7$.

Since temperature also adversely affects fatigue life, the software takes the measured temperature, sensed by a temperature sensor in the Vibration Monitoring Module, into account in predicting life. To account for temperature effects, the software uses a revised form of the Palmgren-Minor equation:

$$L=(t/T)^m_{normal}+(t/T)^m_{high}+(t/T)^m_{severe}$$

Where m is an experimentally derived factor determined by fitting a curve to a plot of the reduction in fatigue life versus temperature.

Thus, in the example above, if a component has been operating at 125° C., at which temperature it has only 70% of its room temperature life, the tool will have used up all its life after 500 hrs at normal vibration, 10 hrs at high vibration and 1 hour at severe vibration.

Complicating the ability to keep track of the remaining fatigue life is the fact that after equipment is used to complete a certain task (drill a well), it is then refurbished and sent out to another well. Each well is unique and imposes different stresses on the components. Therefore, time at temperature, temperature, shock and vibration are generally different and each well uses up some of the life of the tool. Consequently, according to the current invention, a memory device that stores the value of the remaining fatigue life, such as a microchip, can be incorporated into each critical drill string component, such as device 47 incorporated into Vibration Memory Module™ 46 as indicated in FIG. 4. When the component is removed from the well, the software will retrieve the previously stored information on remaining life, update the information based on the operation in the current well, and download the updated information into the memory storage device.

11. Optimizing Drilling Efficiency

In general, the higher the drill bit RPM and the greater the WOB, the higher the rate of penetration by the drill bit into the formation, resulting in more rapid drilling. However, increasing drill bit RPM and WOB can increase vibration, which can reduce the useful life of the BHA components. In a preferred embodiment, the software automatically determines if the optimum drilling performance is being achieved and makes recommendations if it is not. According to the invention, the software 20 utilizes the predicted critical speeds at which resonant vibration or stick-slip occurs and the predicted vibration levels, and measured rates of penetration, to provide information to the drill rig operator as to the optimal rate of penetration that can be obtained without incurring excessive vibration. Drilling optimization begins with a pre-run Well-Drill analysis. The intent of the analysis is to design a BHA that will drill the planned well, have sufficient strength for the planned well and to predict critical speeds to avoid. During the pre-analysis process components of the drill string can be moved or altered to achieve the desired performance. Modifications may include adding, subtracting or moving stabilizers, selecting bits based on vibration excitation and performance and specifying mud motors power sections, bend position and bend angle. Based on the analysis the initial conditions are set.

Once drilling begins optimization trials can take place. Normally the only variable that the drill rig operator can change are drill string RPM, WOB and mud flow rate (which affects the drill bit RPM). The trials involve altering the drilling variable to determine their effect on drilling efficiency. Typical the driller or an automated system would vary the drilling variables by −20%, −10%, 0%, +10% and +20%. These tests can be run without greatly affecting the drilling operation. Another method is drilling run off tests. These tests are performed by weighting up the bit to it upper limit, locking the draw works so that the drill string is fixed at the surface. Then, as the well is drilled, the compression in the pipe is relieved and reduces the WOB, allowing the measurement of the ROP at a constant drill string RPM but varying WOB. This process is repeated at several drill string RPMs and mud flow rates. The results are then ranked as to their drilling performance.

Using the drilling performance results and predicted vibration levels, the software recommends the best set of variables that optimize ROP without producing excessive vibration. Alternatively, the software will generate graphs showing both the predicted axial vibration versus WOB and the measured rate of penetration versus WOB. Using these two graphs, the operator can select the WOB that will result in the maximum rate of penetration without incurring excessive axial vibration. Similar graphs would be generated for other modes of vibration.

In any event, whether the software recommended the optimum operating parameters or the drill rig operator selected them from information provided by the software, the operator would continue to drill at these conditions until there was a change to the drilling conditions. Changes may include bit wear, different formation type, changes in inclination, azimuth, depth, vibration increase, etc. At this time, the optimization process should be re-run.

Figure 15:
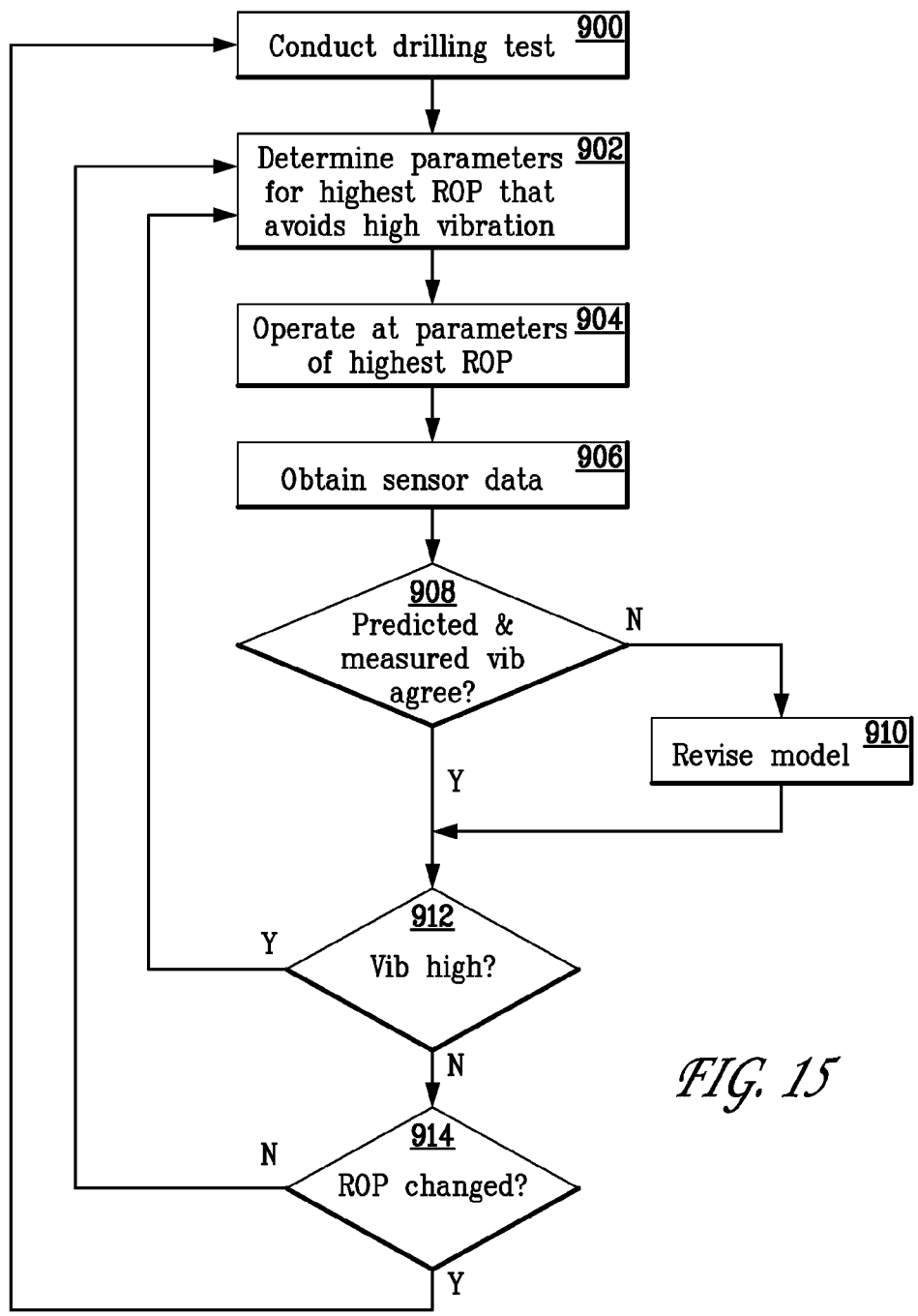
FIG. 15 is a flowchart of the method for operating at the maximum rate of penetration that avoids excessive vibration.

One method of optimizing drilling efficiency is shown in FIG. 15. In step 900, drilling tests are performed, as discussed above, so as to obtain a data base of ROP versus WOB and drill string and drill bit RPM. In step 902, the software determines the critical speeds of the drill string and then determines whether operation at the WOB and drill string/drill bit RPMs that yielded the highest ROP based on the drilling test data will result in operation at a critical speed. Alternatively, the software can predict the level of vibration at the critical components in the drill string at the WOB and drill string/drill bit RPMs that yielded the highest ROP to determine whether operation at such conditions will result in excessive vibration of the critical components. In any event, if the software predicts vibration problems at the operating conditions that resulted in the highest ROP, it will then check for high vibration at the other operating conditions for which data was obtained in the drilling tests until it determines the operating conditions that will result in the highest ROP without encountering high vibration. The software will then recommend to the operator that the drill string be operated at the WOB and drillstring/drill bit RPMs that are expected to yield the highest ROP without encountering excessive vibration.

While operating at the parameters recommended by the software in step 904, data will be periodically obtained from the downhole and surface sensors, as discussed above, in step 906. As also discussed above, in step 908, the software will determine whether the measured and predicted vibration agree and, if they do not, the model will be revised in step 910. Thus, the optimization of drilling parameters will always be performed using an updated WellDrill model that predicts vibration based on real-time data from the sensors. In step 912, the software determines whether, based on the sensor data, the vibration in the drill string is high, for example, by determining whether the drill string operation is approaching a new critical speed or whether the vibration at a critical component exceeds the maximum for such component. If the vibration is high, then step 902 is repeated and the software determines another set of operating parameters that will result in the highest expected ROP without encountering excessive vibration. Based on data from the ROP sensor 34, in step 914, the software determines whether the ROP has deviated from that expected based on the drilling test. If it has, the software may recommend that further drilling tests be performed to create a new data based of ROP versus WOB and drill string/drill bit RPM.

As an example, suppose that a drilling test produced the following ROP data (for simplicity, assume no mud motor so that the drill bit RPM is the same as the drill string RPM):

TABLE XI

| WOB, lbs | 200 RPM | 300 RPM |
|---|---|---|
| 10k | 10 fpm | 20 fpm |
| 20k | 15 fpm | 25 fpm |
| 30k | 20 fpm | 30 fpm |
| 40k | 25 fpm | 33 fpm |

Using the WellDrill model, the software will predict whether operation at 40 k WOB and 300 RPM (the highest ROP point in the test data) will result in operation at a critical speed or in excessive vibration at a critical component. If it does not, the software will advise the operator to operate at 40 k WOB and 300 RPM. Thereafter, each time a new set of sensor data was obtained (or a new section of drill pipe added) the software will (i) revise the model if the predicted vibration at the accelerometer locations does not agree with the measured vibration and (ii) determine whether the vibration is excessive, for example, by using the revised model to determine the vibration at the critical components by extrapolating the measured vibration, as previously discussed.

If, at some point, it is determined that the vibration of the drill string has become excessive, the software will predict the vibration at 30 k WOB and 300 RPM (the second highest ROP point from the drilling test data) and recommend that the operator go to those operating conditions unless it predicted excessive vibration those conditions. Thereafter, each time another set of sensor data was obtained (and the model potentially revised), the software will predict whether it was safe to again return to the initial operating conditions associated with the highest ROP (40 k WOB/300 RPM) without encountering excessive vibration. If the software never predicts that it is safe to go back to the initial operating conditions but, at some point, it determines that the vibration has again become excessive, it will predict vibration at the two sets of parameters that resulted in the third highest ROP—20 k WOB/300 RPM and 40 k WOB/200 RPM—and recommend whichever one resulted in the lower predicted vibration.

In some embodiments, instead of merely recommending changes that the operator makes to the operating parameters, the method described above could be implemented by the software automatically changing the operating parameters so as to automatically operate at the conditions that resulted in maximum drilling performance.

Rather than using ROP as the basis for optimization, the software can use the Mechanical Specific Energy ("MSE") to predict the effectiveness of the drilling, rather than the ROP. The MSE can be calculated, for example, as described in F. Dupriest & W. Koederitz, "Maximizing Drill Rates With Real-Time Surveillance of Mechanical Specific Energy," SPE/IADC Drilling Conference, SPE/IADC 92194 (2005) and W. Koederitz & J. Weis, "A Real-Time Implementation Of MSE," American Association of Drilling Engineers, AADE-05-NTCE-66 (2005), each of which is hereby incorporated by reference in its entirety. Specifically, the MSE is calculated for each combination of RPM and WOB that does not result in excessive vibration from the equation:

$$MSE = [(480 \times T \times RPM)/(D^2 \times ROP)] + [(4 \times WOB)/(D^2 \times \pi)]$$

Where:
MSE=Mechanical Specific Energy
T=drill string torque, ft-lb
RPM=rotational speed of the drill bit
ROP=rate of penetration, ft/hr
WOB=weight on bit, lb
D=diameter of drill bit, inches For purposes of calculating MSE, the software obtains the value of ROP from drilling tests, as described above, as well as the torques measured during the drilling tests. Based on these calculations, the software would recommend to the operator that the drill bit RPM and WOB be revised to the pair of values that yielded the highest MSE value.

12. Determining Operating Efficiency of Mud Motor

Sometimes the cause of lost drilling performance is due to conditions the driller cannot change but he should be made aware of them so he can plan corrective action. In particular the mud motor wear due to the erosive and abrasive conditions with the flow of drilling mud through the motor. This causes wear on both the rotor and stator and similar conditions occur in other tools such as a turbodrills. There is a definite known relationship between flow into the motor and output speed and torque. As the motor wears the speed drops for a given torque. This loss in power is due to leakage thru the motor seals and the leakage increases with increasing load or torque on the motor. Load can be measured by the pressure drop across the motor. Speed can be measured directly by the drill bit speed or frequency or by the nutation speed of the mud motor by performing an Fast Fourier Analysis of the downhole vibration or the surface vibration. A loss in speed for a given flow and differential pressure represents a loss in efficiency of the motor. By comparing the efficiency of a new motor to the actual efficiency we can alert the driller to a drilling performance loss.

Although the invention has been described with reference to specific methodologies for monitoring vibration in a drill string, the invention is applicable to the monitoring of vibration using other methodologies based on the teachings herein. For example, although the invention has been illustrated using mud motor rotary drilling it can also be applied to pure rotary drilling, steerable systems, rotary steerable systems, high pressure jet drilling, and self propelled drilling systems, as well as drills driven by electric motors and air motors. Accordingly, the present invention may be embodied in other specific forms without departing from the spirit or essential attributes thereof and, accordingly, reference should be made to the appended claims, rather than to the foregoing specification, as indicating the scope of the invention.

What is claimed is:

1. A method of monitoring the operation of a drill string drilling into an earthen formation so as to form a bore hole using a drill bit located in a bottom hole assembly, comprising the steps of:

determining the values of a plurality of operating parameters associated with said underground drilling operation, the values of the plurality of operating parameters obtained from a plurality of sensors during the drilling operation, at least a portion of said sensors located in said bottom hole assembly, the plurality of operating parameters including at least a vibration of the drill string;

determining from the determined values of the plurality of operating parameters whether at least one of a plurality of predetermined symptoms of lost drilling performance is present in said drilling operation;

identifying the probability that each of the predetermined symptoms of lost drilling performance determined to be present in said drilling operation are caused by each of a plurality of predetermined causes of lost drilling performance; and combining said identified probabilities for each of the respective plurality of predetermined causes of lost drilling performance for each respective predetermined symptom of lost drilling performance determined to be present in the drilling operation, wherein the greatest combined probabilities among the respective plurality of predetermined causes of lost drilling performance is the most likely cause of lost drilling performance present in said drilling operation.

2. The method according to claim 1, further comprising the step of:

adjusting at least one operating parameter associated with said drilling operation based on said cause of lost drilling performance determined to be most likely present in said drilling operation.

3. The method according to claim 1, wherein said plurality of operating parameters comprises an amplitude of vibration of said drill string in the axial and lateral and torsional vibratory modes.

4. The method according to claim 1, wherein said plurality of operating parameters comprises a frequency of the vibration of said drill string.

5. The method according to claim 1, wherein said plurality of operating parameters comprises a weight on bit (WOB) on said drill bit and a rotary speed of said drill bit.

6. The method according to claim 1, wherein the plurality of predetermined symptoms of lost drilling performance further includes at least one a dynamic of drill string in the bore hole, the operating conditions for the drilling operation, phenomena obtained via sensors disposed on a surface of the earthen formation, and a borehole profile.

7. The method according to claim 6, wherein the plurality of-predetermined causes of lost drilling performance comprises stick-slip.

8. The method according to claim 1, wherein the step of combining said identified probabilities for each of said predetermined causes of lost drilling performance comprises summing said identified probabilities.

9. The method according to claim 1, wherein the step of identifying the probability that each of said parameters determined to be present in said drilling operation are caused by each of a plurality of predetermined causes of lost drilling performance comprising retrieving said probabilities from a data base in which said probabilities are stored.

10. The method according to claim 1, wherein the step of determining from the determined values of the plurality of operating parameters whether at least one of a plurality of predetermined symptoms of lost drilling performance are present in the drilling operation further comprises:

comparing the determined values of the plurality of operating parameters to a predetermined criteria for each one of the plurality of predetermined symptoms of lost drilling performance; and determining if the determined values of the plurality of operating parameters are within the predetermined criteria for each one of the plurality of predetermined symptoms of lost drilling performance so to identify each of the respective plurality of predetermined symptoms of lost drilling performance is present in the drilling operation.

11. A non-transitory computer-readable storage medium having stored thereon computer-executable instructions for performing a method of monitoring the operation of a drill string drilling into an earthen formation so as to form a bore hole using a drill bit, the method comprising the steps of:

determining the values of a plurality of operating parameters associated with said underground drilling operation, the values of the plurality of operating parameters obtained from a plurality of sensors, at least a portion of said sensors located in said bottom hole assembly, the plurality of operating parameters including at least a vibration of the drill string;

determining from said determined values of said plurality of operating parameters whether at least one of a plurality of predetermined symptoms of lost drilling performance are present in said drilling operation;

identifying the probability that each of the predetermined symptoms of lost drilling performance determined to be present in said drilling operation are caused by each of a plurality of predetermined causes of lost drilling performance;

combining said identified probabilities for each of said the respective plurality of predetermined causes of lost drilling performance for each respective predetermined symptom of lost drilling performance determined to be present in the drilling operation, wherein the greatest combined probabilities among the respective plurality of predetermined causes of lost drilling performance is the most likely cause of lost drilling performance present in said drilling operation.

12. The computer-readable storage medium according to claim 11, wherein the step of identifying the probability that each of said parameters determined to be present in said drilling operation are caused by each of a plurality of predetermined causes of lost drilling performance comprising retrieving said probabilities from a data base in which said probabilities are stored.

13. A method of monitoring the operation of a drill string drilling into an earthen formation so as to form a bore hole using a drill bit located in a bottom hole assembly, comprising the steps of:

determining the values of a plurality of operating parameters associated with said underground drilling operation, the values of the plurality of operating parameters obtained from a plurality of sensors, at least a portion of said sensors located in said bottom hole assembly;

comparing the determined values of the plurality of operating parameters to a predetermined criteria for each one of a plurality of predetermined symptoms of lost drilling performance;

determining if the determined values of the plurality of operating parameters are within the predetermined criteria for each one of the plurality of predetermined symptoms of lost drilling performance so as to identify each of the respective plurality of predetermined symptoms of lost drilling performance that is present in the drilling operation identifying the probability that each of the predetermined symptoms of lost drilling performance determined to be present in the drilling operation are caused by at least a first predetermined cause of lost drilling performance, a second predetermined cause of lost drilling performance, and a third predetermined cause of lost drilling performance;

combining said identified probabilities for the respective first, second and third predetermined causes of lost drilling performance for each of the plurality of predetermined symptoms of lost drilling performance determined to be present in the drilling operation; and determining which among the first, second and third predetermined causes of lost drilling performance that has the greatest combined probabilities for each predetermined symptom of lost drilling performance that is determined to present in the drilling operation, wherein the most likely cause of lost drilling performance is the cause of lost drilling performance that has the greatest combined probabilities for each predetermined symptom.

14. The method according to claim 13, further comprising the step of adjusting at least one operating parameter associated with said drilling operation based on said cause of lost drilling performance determined to be most likely present in said drilling operation.

15. The method according to claim 13, wherein said plurality of operating parameters comprises at least a vibration of said drill string obtain by at least one of the plurality of sensors.

16. The method according to claim 15, wherein said plurality of operating parameters comprises an amplitude of vibration of the drill string in the axial and lateral and torsional vibratory modes.

17. The method according to claim 15, wherein said plurality of operating parameters comprises a frequency of the vibration of said drill string.

18. The method according to claim 13, wherein said plurality of operating parameters comprises a weight on bit (WOB) on said drill bit and a rotary speed of said drill bit.

19. The method according to claim 13, wherein the first cause of lost drilling performance includes at least one of axial, torsional, and lateral vibration of the drill string.

20. The method according to claim 19, wherein the second cause of lost drilling performance includes one or more indications of the dynamics of drill string in the bore hole.

21. The method according to claim 20, wherein the third cause of lost drilling performance includes at least one of a plurality of operating conditions for the drilling operation.

* * * * *